United States Patent
Bajema et al.

(10) Patent No.: US 7,137,325 B2
(45) Date of Patent: Nov. 21, 2006

(54) SYSTEM FOR CONVEYING AND SLICING

(75) Inventors: Rick Wendell Bajema, Plano, TX (US); Keith Robert Johnson, Highland Village, TX (US); Gregory Paul Matocha, Richardson, TX (US)

(73) Assignee: Frito-Lay North America, Inc., Plano, TX (US)

( * ) Notice: Subject to any disclaimer, the term of this patent is extended or adjusted under 35 U.S.C. 154(b) by 462 days.

(21) Appl. No.: 10/701,529

(22) Filed: Nov. 5, 2003

(65) Prior Publication Data

US 2005/0092194 A1    May 5, 2005

(51) Int. Cl.
B26D 3/28    (2006.01)
B26D 5/20    (2006.01)
B26D 5/28    (2006.01)
B26D 7/06    (2006.01)

(52) U.S. Cl. .................. 83/42; 83/76; 83/369; 83/402

(58) Field of Classification Search .............. 83/24, 83/72, 74, 76, 76.8, 110, 42, 298, 354, 367, 83/369, 402, 591, 595, 663
See application file for complete search history.

(56) References Cited

U.S. PATENT DOCUMENTS

| | | | |
|---|---|---|---|
| 553,385 A * | 1/1896 | Beamer | 83/356.3 |
| 2,576,288 A | 11/1951 | Fink et al. | |
| 2,769,714 A | 11/1956 | Stahmer | |
| 3,642,495 A | 2/1972 | Davidson et al. | |
| 3,774,524 A | 11/1973 | Howard | |
| 4,015,494 A * | 4/1977 | Spooner et al. | 83/76 |
| 4,251,555 A | 2/1981 | Kroenig | |
| 4,351,232 A | 9/1982 | Kroenig | |
| 4,498,362 A | 2/1985 | Steinke et al. | |
| 4,549,478 A | 10/1985 | Entes | |
| 4,604,925 A | 8/1986 | Wisdom | |
| 4,644,838 A | 2/1987 | Samson et al. | |

(Continued)

FOREIGN PATENT DOCUMENTS

CA    886523    11/1971

OTHER PUBLICATIONS

"Fox Solids Conveying Eductors," Fox Valve: Vacuum Systems, Solids, Conveying, Ejectors, Eductors, posted by Fox Valve Development, Corp., Dover, New Jersey, at http://www.foxvalve.com/conveying_eductors/index.html, printed on Aug. 27, 2003.

(Continued)

Primary Examiner—Kenneth E. Peterson
Assistant Examiner—Sean M. Michalski
(74) Attorney, Agent, or Firm—Carstens & Cahoon, LLP; Colin P Cahoon; William S. Wang

(57) ABSTRACT

A novel food processing system for dividing a flow of food items into a plurality of streams, gently and quickly transporting the food items along a flume of fluid propelled by eductors to several slicers, transversely slicing the food items at a controlled rate to maximize yield, washing the slices, transporting the slices and controllably distributing the slices onto a conveyor for further processing. In accordance with one embodiment of the present invention, the food processing system comprises an oversized-product separator, a segmented cutter, a mass-flow/spreading conveyor, a diverter stage, an eductor stage, a dewatering stage, a starch removal stage, a slicer infeed conveyor, at least one transverse slicer, and a slice spreader. In a preferred embodiment, cutting losses are decreased by minimizing slicing speeds.

9 Claims, 17 Drawing Sheets

U.S. PATENT DOCUMENTS

| | | | |
|---|---|---|---|
| 4,706,556 A | | 11/1987 | Wallace et al. |
| 4,831,922 A | * | 5/1989 | Cogan et al. .................. 99/486 |
| 4,852,441 A | * | 8/1989 | Anders et al. ................ 83/155 |
| 4,933,411 A | | 6/1990 | Gifford |
| 4,945,794 A | | 8/1990 | Quo et al. |
| 5,042,342 A | | 8/1991 | Julian |
| 5,060,563 A | | 10/1991 | Plant et al. |
| 5,174,181 A | | 12/1992 | Julian et al. |
| 5,181,458 A | | 1/1993 | Plant et al. |
| 5,226,334 A | * | 7/1993 | Pegoraro ....................... 83/42 |
| 5,228,397 A | | 7/1993 | Plant et al. |
| 5,275,071 A | | 1/1994 | Plant et al. |
| 5,343,791 A | | 9/1994 | Julian et al. |
| 5,390,590 A | | 2/1995 | Mendenhall |
| 5,394,793 A | | 3/1995 | Julian et al. |
| 5,421,226 A | | 6/1995 | Mendenhall |
| 5,555,787 A | | 9/1996 | Barber et al. |
| 5,694,824 A | | 12/1997 | Jacko et al. |
| 5,780,780 A | | 7/1998 | Ahmed |
| 6,148,702 A | * | 11/2000 | Bucks ........................... 83/13 |
| 6,164,174 A | * | 12/2000 | Sigurdsson et al. ............ 83/13 |
| 6,213,308 B1 | | 4/2001 | Bajema |
| 6,293,407 B1 | | 9/2001 | Bajema |
| 6,540,911 B1 | | 4/2003 | Bajema |
| 6,619,525 B1 | | 9/2003 | Frankeburger et al. |
| 6,619,889 B1 | | 9/2003 | Sinker et al. |
| 6,826,989 B1 | * | 12/2004 | Wattles et al. ................ 83/102 |
| 6,882,434 B1 | * | 4/2005 | Sandberg et al. ........... 356/601 |

OTHER PUBLICATIONS

Brochure titled, "Cornell Pump Company, Food Process Pumps," posted by Cornell Pump Company, Portland, Oregon, at http://www.cornellpump.com/pdf_brochures/food.pdf, printed Aug. 2003.

"Technology Sourcebook, Potato halver," Food Engineering, printed from http://www.foodengineering.org/CDA/ArticleInformation/products/B.../0,2376,95172.htm on Sep. 11, 2003.

Brochure titled, "Weighbelt Feeders," posted by Schenck AccuRate, Whitewater, WI, at http://www.accuratefeeders.com/broch_weighfeeder.pdf, printed Aug. 2003.

"Efficient Mixing, Blending and Conveying of Product for the Cosmetic, Food and Pharmaceutical Industries," posted by Vortex Ventures, Inc., Houston, Texas, at http://www.vortexventures.com/Industry/CFP/CFP.htm, printed on Sep. 22, 2003.

* cited by examiner

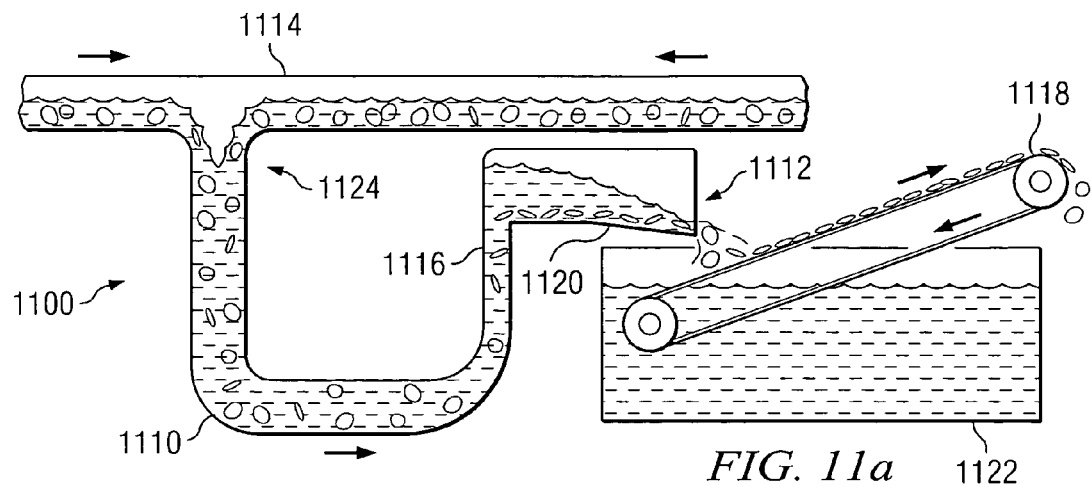
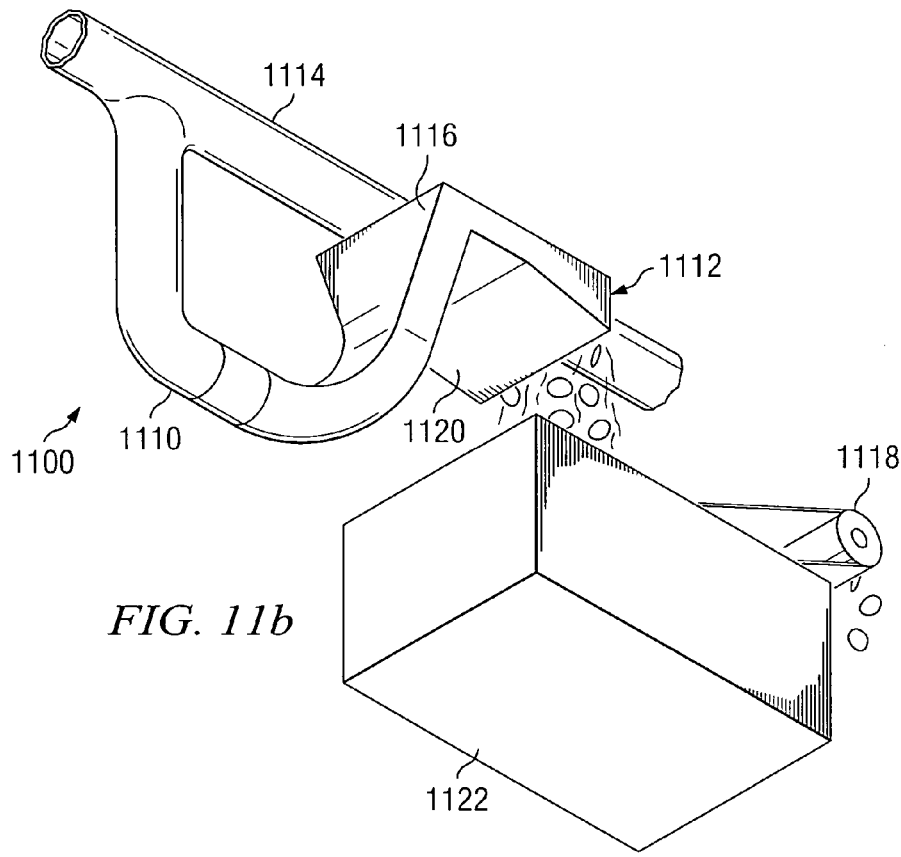
FIG. 11a
FIG. 11b
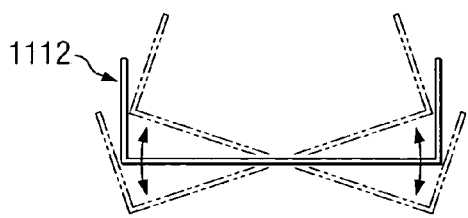
FIG. 11c
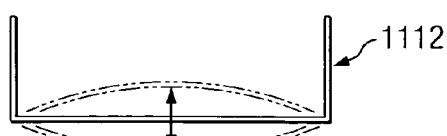
FIG. 11d

SYSTEM FOR CONVEYING AND SLICING

BACKGROUND

1. Technical Field

The present invention relates to a system for processing food items to form slices. More specifically, this invention relates to hydraulically transporting food items with the use of an eductor, reducing the size of large items using a segmented cutter, maximizing cutting efficiency by controlling velocities and mass flow rates, slicing food items with a transverse slicer, controlling slicing velocities to optimize performance, and controllably spreading the resulting slices upon a conveyor for further processing.

2. Description of Related Art

The commercial process of processing produce such as vegetables, tubers, nuts, and fruit requires sized reduction of large volumes of food stuffs. The present invention will be described in terms of transporting and slicing potatoes to make potato chips. However, as those skilled in the art will appreciate, the present invention can be employed for a wide variety of uses other than making potato chips.

Prior art industrial-sized potato slicing systems typically use centrifugal slicers to cut potatoes into slices, which can be used to make products such as potato chips, or dishes such as scalloped potatoes and au gratin potatoes. A centrifugal slicer, such as the Urschel Model Continuous Cut ("CC") Slicer, manufactured by Urschel Laboratories, Inc., comprises several upright blades arranged in a ring around a central impeller or rotary disk. FIG. 6 of U.S. Pat. No. 5,694,824, granted to Jacko et al., for example, shows one such prior art centrifugal slicer. As potatoes are fed into the slicer, the rotating impeller or disk initially throws potatoes against the blades and then pushes the potatoes across the blades, thereby shaving slices from the potatoes.

Centrifugal-type slicers, however, have several drawbacks. One such drawback is reduced yield due to high slicing velocities. In order for centrifugal slicers to work properly, a minimum amount of rotational speed is required to create the centrifugal force necessary to force the potatoes against the cutting surfaces. As a result of the relatively high slicing and impact speeds, centrifugal slicers (or cutters) generally produce a considerable amount of waste and scrap. For example, a potato can be damaged when it is thrown against the slicer walls between blades, as well as when a blade merely nicks the surface but fails to remove a slice. Furthermore, the high slicing speeds cause a significant amount of potato cell damage. A potato's starch-containing cells are viscoelastic, which means that the more quickly pressure is applied during slicing, the more brittle the cell walls become. Thus, the number of potato cells damaged per slice increases as the slicing speed increases. When potato cells break, the contained starch is released, resulting in reduced product yield. As much as 16% by weight of the potato feed can be lost to waste, scraps, and cell damage when using centrifugal slicers.

A second drawback of centrifugal-type slicers is the undesirable level of cracking that such slicers can impart in the slices. Because the viscoelastic potato cells become more brittle with increased blade impact speed, the slices become more likely to crack as the impact speed increases. Such cracking undesirably increases the occurrence of slice fold-overs and the amount of oil-uptake.

In addition, centrifugal slicers can only accommodate round chipping potatoes and cannot accommodate large elongated potatoes. Elongated potatoes tend to plug centrifugal slicers. Elongated potatoes also tend to lay sideways in such slicers, which undesirably increases variability in slice thickness. Moreover, centrifugal slicers create undesirably shaped, oblong potato chips when supplied with normal elongated potatoes. FIGS. 1a and 1b show examples of slices produced when a centrifugal slicer is supplied with a round potato 110 versus an elongated potato 140. A centrifugal slicer will slice a round chipping potato 110 into round slices with ridges 130 or without ridges 120, depending upon whether the slicer's blade edges are corrugated. In contrast, a centrifugal slicer will slice an elongated potato 140 lengthwise into oblong slices with or without ridges 160, 150, depending on whether the blade edges are corrugated. While some variation in slice or chip shape is acceptable, slices or chips having extreme aspect ratios (ratio of length to width) may be undesirable in some circumstances. Thus, elongated potatoes are generally not used in centrifugal slicers because of the potentially undesirable oblong-shaped slices they produce.

Although several non-centrifugal-type cutters exist for processing potatoes, few of them relate specifically to creating potato slices suitable for products such as potato chips. For example, U.S. Pat. Nos. 5,394,793, and 5,343,791, granted to Julian et. al., disclose rotating cutting head assemblies for cutting singular potatoes into helical strips. As the spiral cutting heads rotate, they make continuous helical bores through singular potatoes, thus making helical strips. The devices disclosed in the '793 and '791 patents, however, are not suitable for cutting potato slices.

A few potato slicer systems use horizontal discs with blades to slice potatoes. For example, U.S. Pat. No. 4,706,556, granted to Wallace et al., discloses a horizontal slicing disc with an inclined potato feeding tube. Wallace et al. teach that the potatoes must be individually removed from a washer drum and deposited into the slicer's feed tube. Prior to the current invention, however, there has been no automated slicing system for maximizing cutting efficiency and product yield. More specifically, there has been no automated system for controlling the feed rate of the potatoes to a transverse slicer and slicing the potatoes at an automatically controlled and reduced slicing speed.

Many prior-art slicing systems transport potatoes from one place to another by propelling them with an impeller-type food pump such as the Single Port Impeller Pump manufactured by the Cornell Pump Company. A significant number of the potatoes, however, are damaged as the potatoes travel through the pump and are struck by the rotating impeller. Furthermore, impeller-type food pumps draw a significant amount of energy and can therefore be expensive to operate. The cost of periodically replacing the impellers due to wear and tear also adds to the operating and maintenance costs. Other slicing systems, with the use of a venturi, accelerate a flow of solid food items and water through a set of stationary blades. For example, U.S. Pat. No. 5,390,590, granted to Mendenhall, discloses both concepts. Mendenhall discloses a hydraulic cutter in which a centrifugal food pump sends potatoes and water through a venturi tube, which in turn accelerates the potatoes through a grid of stationary blades. Slicing systems such as that disclosed in Mendenhall, however, relate to processes for making french fries and are not suitable for making potato chips or other products using potato slices. Prior to this invention, few potato slicing systems have used an eductor/venturi system to gently transport potatoes in a non-destructive manner throughout a process for making slices. Furthermore, no prior art slicing system has used a plurality of diverters to divide a stream of food items into several independently controlled streams, gently fed such food items into and propelled such streams through a manifold of several independently controlled eductors.

Prior art potato processing systems use potato halvers, such as Grove Dale Corporation's Auto Halver, to reduce the size of potatoes that are too large for processing. These potato halvers cut potatoes cross-wise along the short axis to reduce the overall length of oversized potatoes by half. Such halvers, however, are not suitable in potato slicing systems in which potatoes are cut into transverse slices, since such cutters do not reduce the diameter of potato pieces in the minor dimension.

Another problem encountered with prior art methods and devices is that the resulting potato slices often undesirably clump together as they exit the slicers and are moved downstream for further processing. Slice clumping prevents the slices from being evenly distributed upon a conveyor. Slice clumping also hinders the slices from being properly baked, toasted, or fried.

Resulting potato slices often contain slicing scraps, loose starch and other undesirable fines that are desirably removed from the slices before further processing. Prior art slicing systems typically remove loose starch, slicing scraps and fines by transporting slices to, and processing them through, a separate washing unit. Thus, there is a need for a simplified method for removing loose starch and slicing scraps.

Consequently, a need exists for a food processing system that can slice food items such as potatoes with less waste and scrap, as well as accommodate a wider variety of food shapes. More specifically, such a system should process potatoes with a relatively slower slicing speed and accommodate both round and oblong potatoes by slicing potatoes transversely. Such a system should also reduce oversized potatoes by slicing them lengthwise into smaller-diameter segments. The novel system should transport potatoes and potato segments in a flume of fluid towards at least one slicer with the use of an eductor/venturi system that gently propels potatoes in a non-destructive manner. Once cut, the system should transport the slices in a flume of fluid for further processing. Such a flume of fluid should also wash away loose starch, remove slicing scraps and remove undesirable fines from the slices. In addition, such a slicing system should prevent slice clumping and controllably distribute slices upon a conveyor leading to the next processing unit operation. Such a system should preferably be automated, but it should also be amenable to manual operation if desired.

SUMMARY OF THE INVENTION

In accordance with one embodiment of the present invention, the food processing system comprises an oversized-product separator, a segmented cutter, a mass-flow/spreading conveyor, a diverter stage, an eductor stage, a dewatering stage, a starch and fines removal stage, a slicer infeed conveyor, at least one slicer, and a slice spreader. In a preferred embodiment, potatoes and potato slices are transferred quickly and gently using flumes of fluid, potato slices are gently washed while being transferred, and cutting losses are decreased by minimizing slicing speeds.

In a preferred embodiment, an oversized-product separator separates oversized potatoes from a potato feed to ensure that the oversized potatoes will not jam the feed tubes of downstream potato slicers. A segmented cutter reduces the diameter of oversized potatoes by forcing such potatoes through a set of blades. Acceptably sized potatoes exiting the oversized-product separator then pass through a mass-flow/spreading conveyor before being divided into two or more lanes in a diverter stage. Weigh conveyors (or load cells) are used to regulate the mass flow rate of potatoes in the mass-flow/spreading conveyor in order to help maintain a constant mass flow rate for mass-flow-rate sensitive units downstream, such as a frying unit.

After the mass-flow/spreading conveyor, the potatoes then enter a diverter stage to be divided into two or more potato streams. At least one diverter, or movable divider, divides the flow of potatoes into two or more streams of potatoes. Thereafter, the streams of potatoes are kept apart by stationary dividers, separate channels, pipes, or conveyors, and each stream of potatoes is lead into an eductor stage where the potatoes are propelled further downstream.

Each eductor in the eductor stage comprises a fluid jet pump that accelerates a fluid flow through a narrowing section of a pipe or channel, to which a product in-feed line is also connected. Each stream of potatoes is propelled along this stream of water ("eductor flume") from the eductor stage to a dewatering stage, which is typically located fairly close to a corresponding slicer. Because each stream of potatoes is isolated from the other streams and is propelled by its own eductor, each stream can be independently controlled. Furthermore, each eductor can be independently controlled to vary the properties of each diverted stream even though each flume may originate from a common supply of water that is propelled by a single, common pump.

Once the potatoes have been dewatered, the slicer infeed conveyor feeds the potatoes into each slicer. Sensors positioned over the slicer infeed conveyors measure the individual potato velocities and the duty cycles of at least one lane of potatoes leading into each slicer.

The potatoes are then fed into transverse slicers, and the RPM set point of each slicer is adjusted to the minimum rate necessary to process the flow of potatoes. The slices exiting the slicers are transported along a flume of water into a slice spreader, which controllably distributes the slices onto a dewatering conveyor for further processing. In addition to serving as a medium within which the slices are transported, the flume of water also washes the starch, fines and other scrap material from the slices. Upon being discharged from the slice spreader, the dewatering conveyor lifts the washed slices away from the flume/wash water.

A starch removal unit can be used to remove any starch, fines and other particles entrained in the water used throughout the system, and the purified water can be recycled.

The above as well as additional features and advantages of the present invention will become apparent in the following written detailed description.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

FIG. 8b is a front cross-sectional view of the diverter stage shown in FIG. 8a;

FIG. 8c is a front cross-sectional view of one diverter of the diverter stage shown in FIG. 8a;

FIGS. 11a and 11b are respectively a side elevational view and a perspective view of a slicer spreader in accordance with a preferred embodiment of the present invention;

FIG. 11c is a front cross-sectional view of a spreader discharge at various angles of tilt;

FIG. 11d is a front cross-sectional view of a spreader discharge in concave and convex positions;

DETAILED DESCRIPTION

Food Processing System

While the invention is described below with respect to a preferred embodiment in which potatoes are reduced using a plurality of transverse slicers, other embodiments are possible. The concepts disclosed herein apply equally to systems for slicing other types of produce and food items including vegetables, tubers, nuts, and fruit. Furthermore, the invention is not limited to the use of transverse slicers, and other types of slicers can be used. It should also be noted that in the illustrated embodiments, the various objects and layers are drawn at a scale suitable for illustration rather than at the scale of the actual material.

Figure 5:
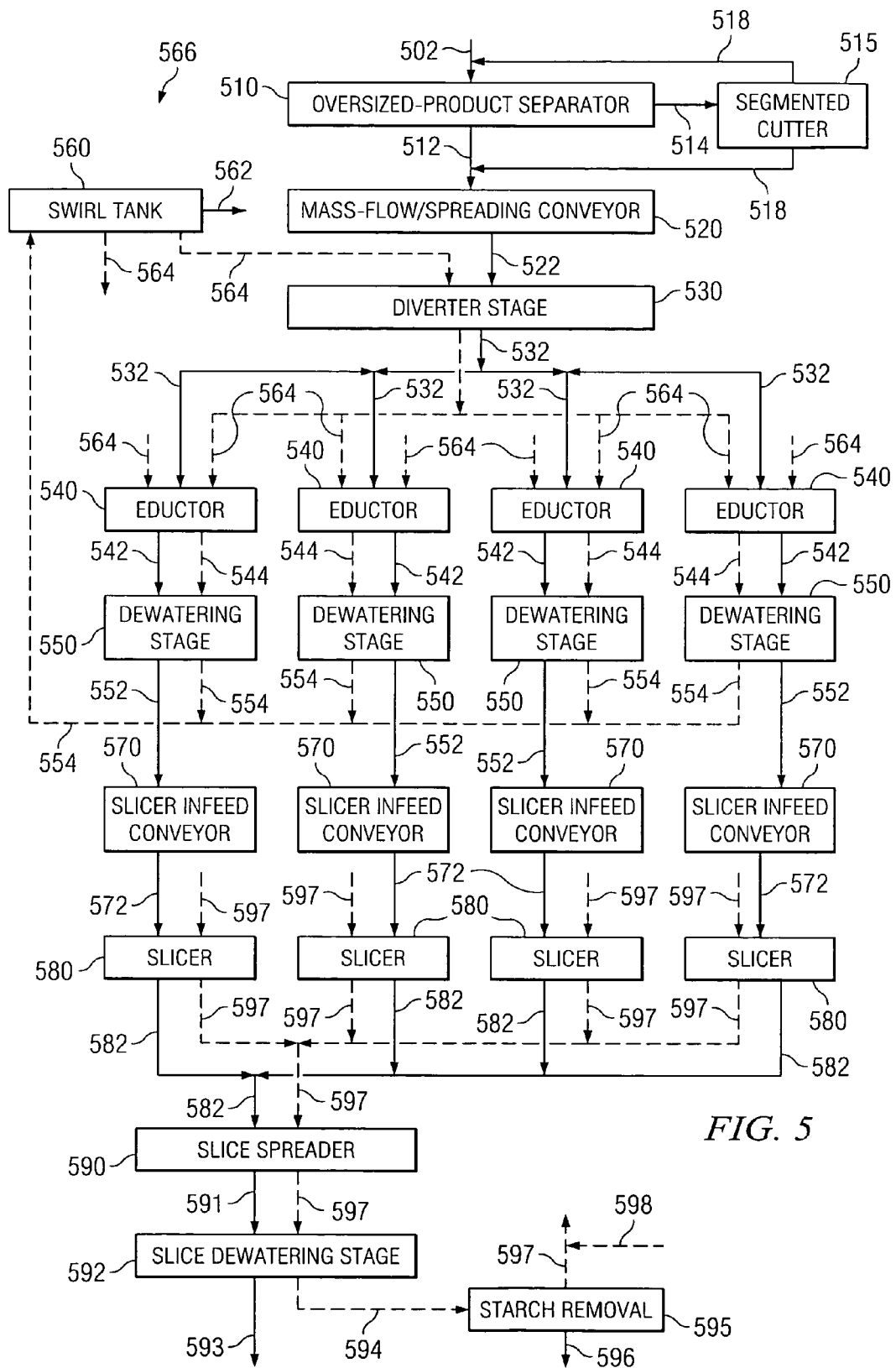
FIG. 5 is a flow chart of a slicing system having one or more slicers in accordance with one embodiment of the present invention.

FIG. 5 is a flow chart of a food processing/slicing system having one or more slicers 580 in accordance with one embodiment of the present invention. The path of the product to be sliced is represented by solid lines, and the presence of water is represented with dotted lines. In a preferred embodiment, whole peeled potatoes 502, which can be round and/or oblong, first enter an oversized-product separator 510. This separator 510 ensures that oversized potatoes and potato pieces 514 will not jam the feed tubes of the potato slicers 580 located further downstream. In a preferred embodiment, the oversized-product separator 510 comprises a plurality of parallel augers or screws that are spaced such that any potatoes or potato pieces having diameters smaller than the diameter of the downstream slicer feed tubes can pass between the augers. Peeled potatoes 502 are poured over the plurality of parallel augers, and the acceptably sized (normal sized) potatoes and potato pieces 512 pass through the separator 510 and are moved downstream for further processing. Oversized potatoes and potato pieces 514, which are those having diameters larger than the diameter of downstream slicer feed tubes, will instead remain supported upon the augers. In operation, the augers rotate along their long axes so that the oversized potatoes are carried to a separate container or conveyor. The oversized potatoes and pieces 514 are then sent to a segmented cutter 515 that reduces their diameters. The reduced-diameter segments 518 are then returned to the potato feed stream 502 entering the separator 510. If the reduced-diameter segments 518 still have minor-dimension diameters (diameters measured within a plane perpendicular to the long axis of the potato or segment) that are too large for the downstream slicers, they will again be separated from the feed stream 502 and processed through the segmented cutter 515. This cycle will continue until the oversized pieces are reduced to an acceptable size. It is also possible, however, to feed the reduced-diameter segments 518 into the stream of acceptably sized potatoes and potato pieces 512 exiting the separator 510.

A segmented cutter 515 reduces the diameter of oversized potatoes 514 by forcing such potatoes through a set of blades. Oblong potatoes are first oriented so that their longest axis is approximately parallel to the blades. The potatoes are then cut approximately lengthwise in order to decrease the diameter about the long axis (the diameter in the minor dimension). A variety of devices can be used to reduce the diameter of the potatoes and potato pieces. In a preferred embodiment, the segmented cutter comprises three curved blades radiating from a shared axis and secured at their radial ends to the inner surface of a cylinder. The shared axis is preferably parallel to the centerline of the cylinder. If desired, the blades can be moved during operation so that their shared axis aligns with the long axis of the potato to be segmented. Because consumers tend to dislike potato chips having straight edges, the segmented cutter's blades should curve as they radiate outwards from the center of the cutter to the surrounding cylinder. Other blade orientations are possible, and more or less than three blades can be used if desired. The segmented cutter should cut each oversized potato into a minimum of two lengthwise segments in order to ensure that the majority of resulting segments have diameters less than that of the cut oversized potato. Because most potatoes are not perfectly symmetrical, a single-blade segmented cutter having a one blade will usually be sufficient to reduce each over-sized potato into two halves/segments, with each segment having a diameter smaller than the whole potato. Furthermore, even if the resulting segments still have diameters that are too large, the segments can be recycled through the separator and segmented cutter until the lengthwise segments ultimately have acceptable diameters.

In the potato slicing system shown in FIG. 5, the acceptably sized potatoes 512 exiting the oversized-product separator 510 then pass through a mass-flow/spreading conveyor 520 before being divided into two or more lanes by a diverter 530. The mass-flow/spreading conveyor 520 controls the flow rate of potatoes entering the diverter 530. As will be explained in more detail, the flow rate of potatoes 512 passing through the mass-flow/spreading conveyor is preferably adjusted according to downstream supply, demand, and capacity conditions.

The mass-flow/spreading conveyor 520 can comprise a metering belt, a screw feeder, mass/weigh conveyor, vibratory conveyor or various combinations thereof. In a preferred embodiment, the mass-flow/spreading conveyor comprises a vibratory conveyor, such as an accumulation/distribution vibratory conveyor manufactured by FMC Technologies, followed by a vibratory mass/weigh conveyor such as that disclosed in U.S. Pat. No. 5,780,780, granted to Ahmed. The vibratory conveyor helps evenly spread the flow of potatoes 512 onto the weigh conveyor. The weigh conveyor, which can comprise of load cells for measuring weight, is designed to carry a specific range of weight. The speed of the vibratory conveyor can be adjusted to ensure that the desired mass flow rate is conveyed through the weigh conveyor. If desired, a metering belt or conveyor can also be used in addition to, or instead of, the vibratory and weigh conveyors in order to help regulate the flow of potatoes. For example, an incline metering belt can be used to transfer a metered flow of potatoes onto the vibratory conveyor. Such an incline metering belt can also be used before the oversized-product separator 510 to transfer a controlled flow of potatoes from a hopper (or other storage area) to the separator 510. In another embodiment, the mass-flow/spreading conveyor can comprise a hopper-fed load-cell conveyor. The hopper spans the width of the conveyor and feeds a constant depth of potatoes onto the conveyor. The velocity of the conveyor can then be adjusted to control the flow rate of the potatoes.

If the regulated flow of potatoes 522 will supply more than one downstream slicer 580, the potatoes 522 will then enter a diverter stage 530 to be divided into two or more potato streams 532. A column of water within the diverter stage, which can be of any depth within the structure, provides a supportive medium through which the potatoes can gently descend. At least one diverter, or movable divider, divides the flow of potatoes 522 into two or more streams of potatoes 532. Thereafter, the streams of potatoes 532 are kept apart by stationary dividers, separate channels, pipes, or conveyors, and each stream of potatoes 532 is lead into an eductor stage 540 where the potatoes 532 are propelled further downstream. In a preferred embodiment, the diverter stage comprises a descending structure that encloses a descending passage and has one or more fixed dividers. These dividers segregate the lower portion of the descending passage into two or more channels (or lanes). The diverter stage, however, need not be perfectly vertical and can be also be at an angle. Moveable or flexible dividers are attached to the top ends of some or all of the fixed dividers. More preferably, a movable, rigid divider is hinged at its bottom end to the top of each fixed divider.

Once the potatoes 522 have been divided into two or more streams, each stream of potatoes 532 is propelled by an eductor 540 towards that stream's respective slicer 580. Note that while FIG. 5 depicts four streams of potatoes, each stream passing through its own eductor 540, dewatering stage 550, slicer infeed conveyor 570 and slicer 580, any number of streams are possible. If desired, the fluid flowing through all of the eductors 540 can be supplied by a common water supply and propelled by a common pump. The ability to divide a single supply of water into several independently controllable streams adds flexibility to the system and reduces capital and operating costs. Whereas a multi-slicer system might otherwise require separate conveyor systems or individual pump-and-flume systems to supply each slicer, the diverter-eductor system of the present invention allows one to use a single source of water and a single pump to transfer potatoes to each slicer. Each eductor 540 comprises a fluid jet pump that propels a fluid flow 564 (or eductor flume) through a section of a pipe or channel to which a product in-feed line 532 is also connected. This section of pipe, to which the product in-feed line 532 is connected, is preferably a narrowing section, and each eductor 540 preferrably accelerates the fluid flow 564 through the narrowing section to reduce the static pressure of the fluid in the product in-feed area. As the fluid flow 564 accelerates through the narrowing section, the fluid flow 564 creates a low pressure due to Bernoulli's principle. This low pressure (or suction) draws product 532 into the fluid flow 564. However, the product in-feed area need not be in a narrowing section of pipe in applications where the food items naturally fall down into the eductor flumes under the force of gravity. The fluid flow 542 then carries the product 532 onward for further processing. Unlike prior art centrifugal-type food pumps, eductors do not have moving blades or turbines that can damage product being conveyed. In fact, eductors require no moving parts and are thus gentler on the product than the prior art centrifugal-type food pumps. While water is used as the fluid medium in a preferred embodiment, other fluids such as cooking oil can also be used to transport the food items.

Each stream of potatoes 542 is propelled along a jet stream of water ("eductor flume") from the eductor stage 540 to a dewatering stage 550, which is typically located fairly close to a corresponding slicer 580. The dewatering stage 550 is used to separate the water stream 554 from the potato stream 552. The separated water stream 554 then passes through a swirl tank 560 before being recycled 564 to the diverter and eductor stages 530 and 540. Recycled water 562 can be removed from, and fresh water 566 can be supplied to, the swirl tank 560 in order to control the concentration of starch, fines, and other particles, as well as control the amount of water flowing through the system. If desired, filters, cyclones, and other devices known in the art can be used to remove particulates from the recycled water. Once the potatoes 552 have been dewatered, the slicer infeed conveyor 570 transfers the flow of potatoes 572 into each slicer 580. Jets of water 597 may be introduced into the feed tubes for several reasons. One benefit of providing a wet environment during slicing is that it reduces starch buildup in the slicers 580. A second benefit of waterjets 597 is that they can be used to orient the potatoes 572 for proper slicing. They can also be used to push the potatoes 572 to the leading side of the feed tubes, which is where the cutting blades will eventually lead the potatoes 572. A third benefit of water jets 597 is that they can be used to press the potatoes 572 against the blades with a constant pressure. Applying a constant pressure on the potatoes 572 helps minimize unwanted variation in slice thickness. The slices 582 exiting the slicers 580 are transported along a flume of water 597 into a slice spreader 590, which controllably distributes the slices 592 onto a conveyor in a slice dewatering stage 592 for further processing. As will be explained in more detail, feedback from downstream processes units, such as a fryer, can be used to adjust the way in which the slice spreader 590 distributes slices 591 onto the conveyor. A starch removal unit 595 can also be used to remove any starch and other particles 596 entrained in the water drained from the potatoes 594 in the slice dewatering stage 595. Fresh water 598 may be added to the recycle stream 597 flowing from the starch removal unit 595 to the slicers 580 and slice flumes to maintain the desired flow rate and turnover rate.

Oversized-Product Separator

Figure 6:
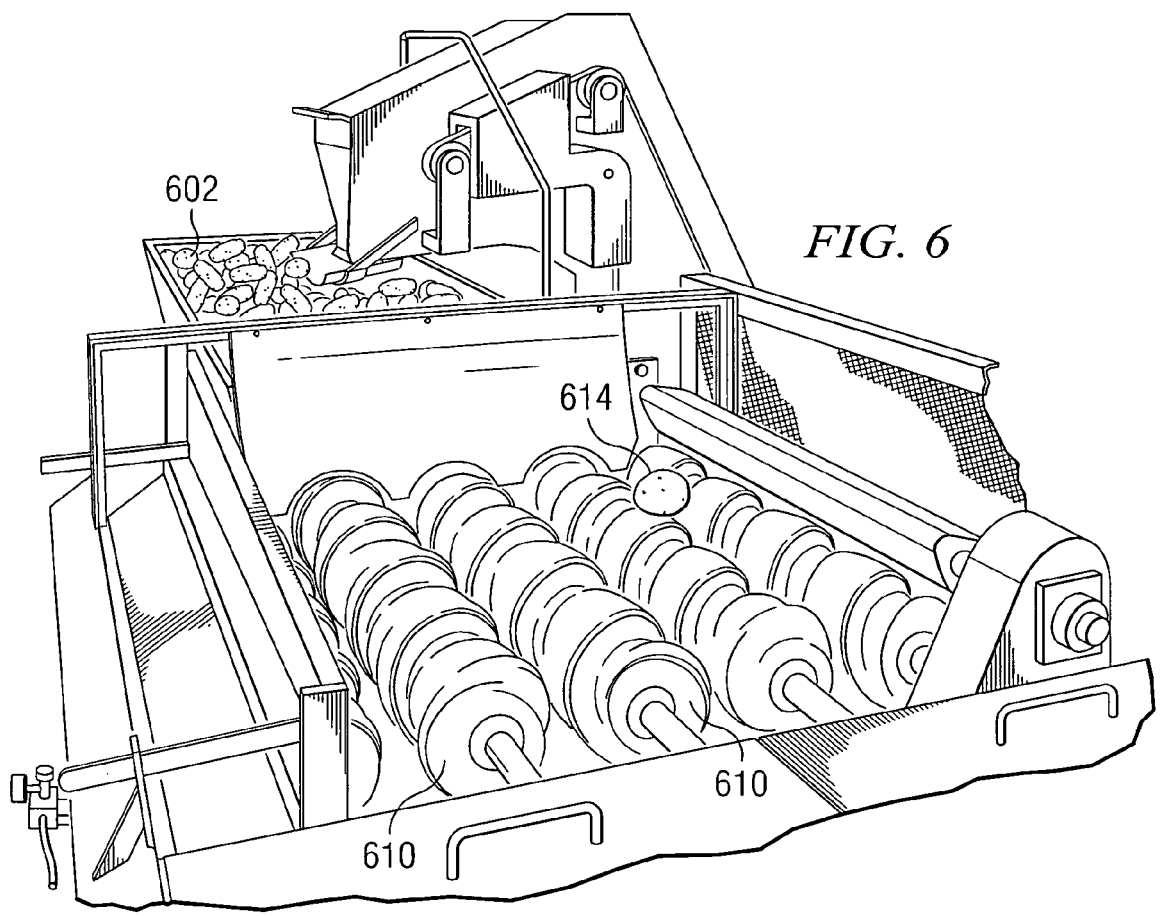
FIG. 6 is a perspective view of an oversized-product separator in accordance with one embodiment of the present invention.

FIG. 6 depicts an example of multiple, parallel augers 610 separating an oversized potato 614 from the rest of a potato feed 602, in accordance with a preferred embodiment. Oversized potatoes 614 are carried upon the parallel augers 610 and deposited onto a conveyor that leads the oversized potatoes 614 to a segmented cutter. The acceptably sized potatoes fall between the augers 610 and are collected and conveyed downstream for further processing.

Figure 13:
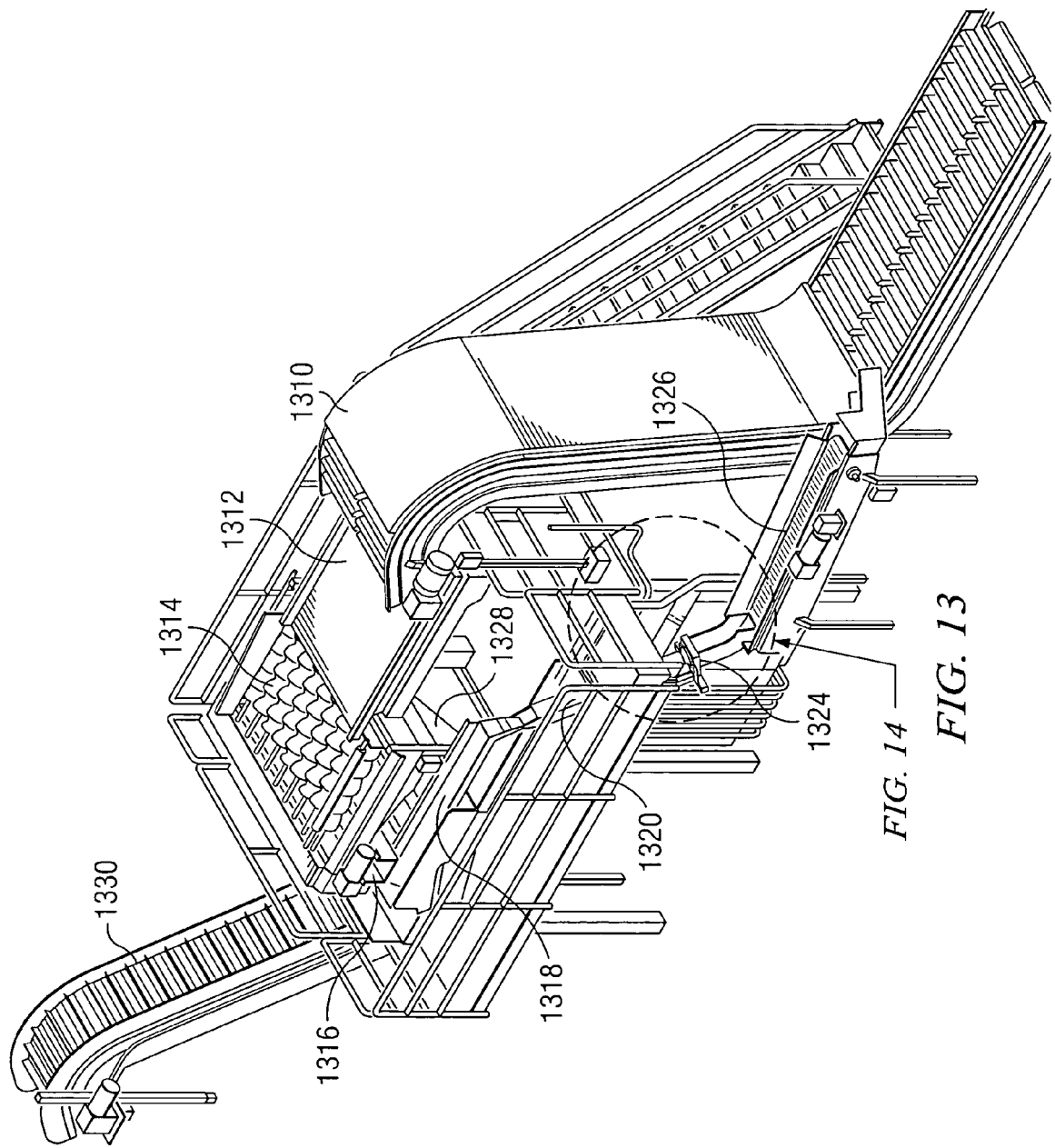
FIG. 13 is a perspective view of an oversized-product separator and a segmented cutter in accordance with one embodiment of the present invention.

FIG. 13 is a perspective view of an oversized-product separator and a segmented cutter in accordance with one embodiment of the present invention. In the embodiment shown in FIG. 13, a first incline conveyor 1310 raises potatoes up to a vibratory conveyor 1312. The vibratory conveyor 1312 evenly spreads the potatoes and distributes them onto the parallel augers of an oversized-product separator 1314. Normal sized potatoes fall through the augers 1314 and into a collecting chute 1328, which then directs the potatoes onto an incline metering conveyor 1330 for further processing.

As the parallel augers rotate, they move any potatoes too large to fall between the augers (oversized potatoes) to the end of the separator and onto an oversized-product collecting conveyor 1316. The oversized potatoes are then conveyed along another conveyor 1318 to an accelerating chute 1320. The oversized potatoes drop into and accelerate down the accelerating chute 1320 under the force of gravity and pass through a segmented cutter 1324 located at the bottom of the chute 1320. If desired, water, oil, or some other liquid can be introduced into the chute 1320 to help the potatoes slide down the chute without tipping end over end. After passing through the segmented cutter 1324, the resulting potato segments are transferred along a return conveyor 1326 back onto the first incline conveyor 1310.

Figure 14:
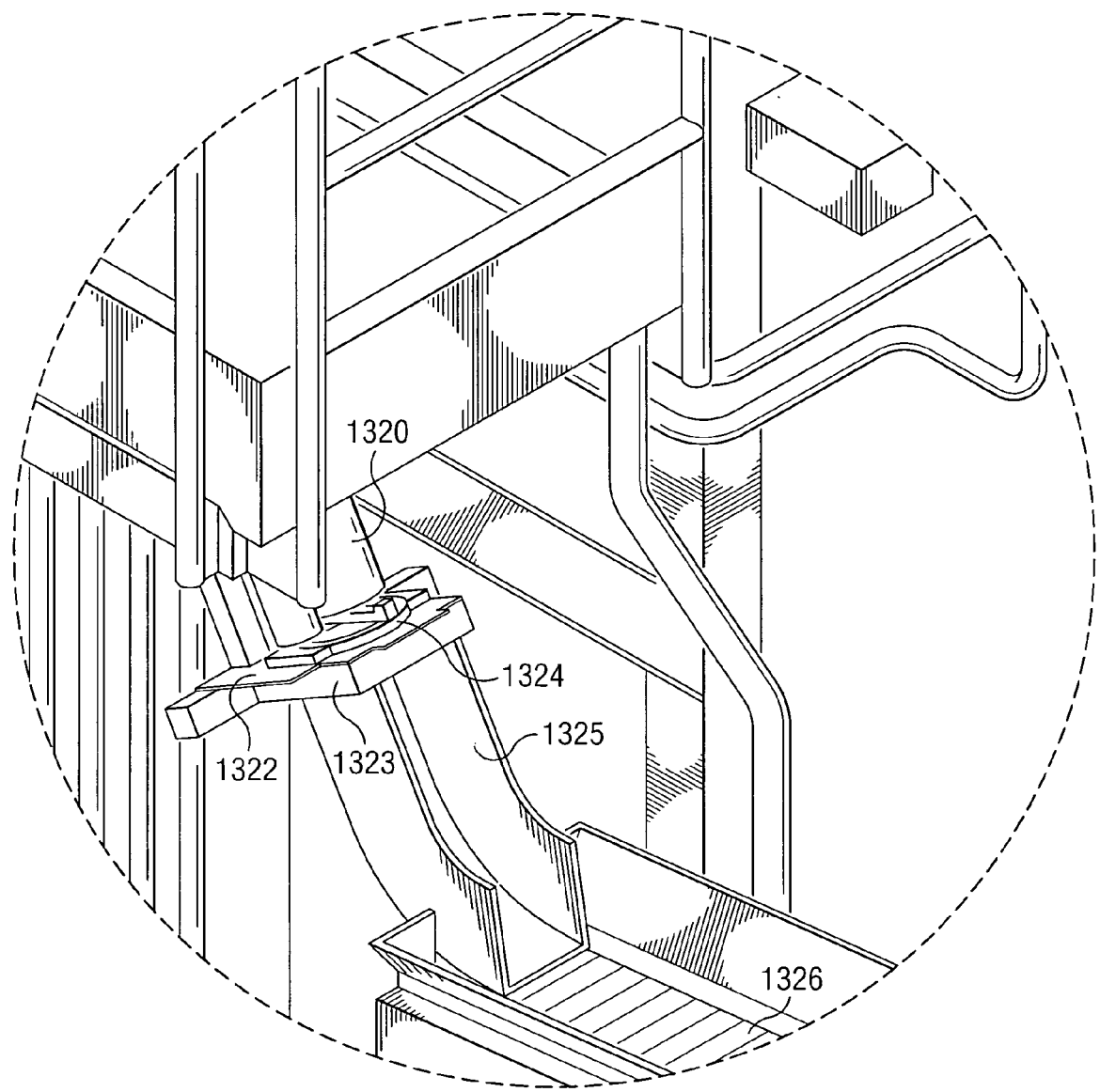
FIG. 14 is an enlarged perspective view of the segmented cutter shown in FIG. 13.

FIG. 14 is an enlarged perspective view of the segmented cutter shown in FIG. 13. The accelerating chute 1324 leading into the segmented cutter 1324 is preferably round and tilted downwards but not completely vertical. As the potatoes slide down the chute 1320, they naturally align themselves lengthwise down the chute. For ease of removal, the segmented cutter can be mounted on a plate 1322 having handles. In a preferred embodiment, the plate 1322 is easily secured and removed from between the chute 1320 and a support block 1323. The potato segments exiting the segmented cutter 1324 then slide down the terminal portion of the chute 1325 and onto the return conveyor 1326. Although the terminal portion of the chute 1325 is an open channel having a rectangular cross-section in the embodiment shown in FIGS. 13 and 14, the terminal portion of the chute 1325 can be of any cross-sectional shape. For example, the terminal portion 1325 can instead comprise a circular tube or a v-shaped channel.

Note, however, that while product is accelerated under the force of gravity through a segmented cutter in a preferred embodiment, other methods of reducing product using a segmented cutter are possible. For example, product may instead be held stationary while a segmented cutter moves down the lengthwise axis to form smaller-diameter segments.

Segmented Cutter

Figure 7A:
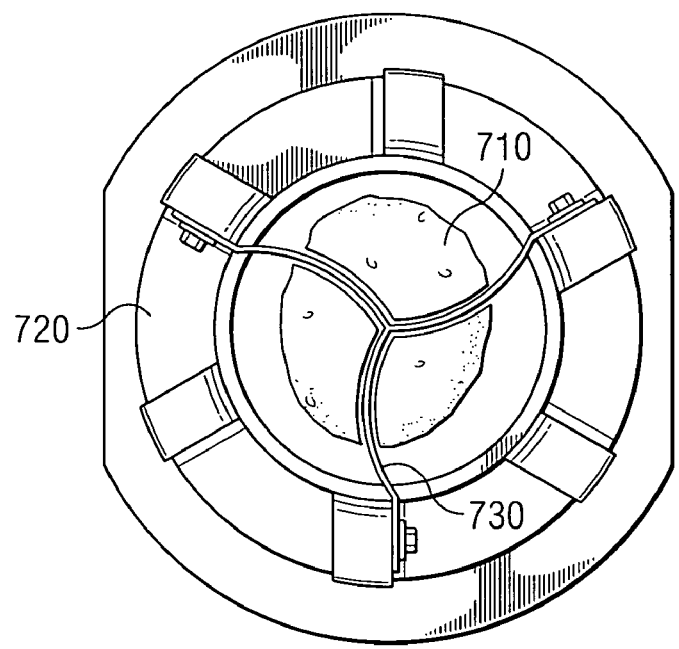
FIGS. 7a and 7b are, respectively, a front elevational view and a side elevational view of an oblong potato being cut by a tri-blade segmented cutter having curved blades that radiate from a shared center, in accordance with a preferred embodiment.
Figure 7B:
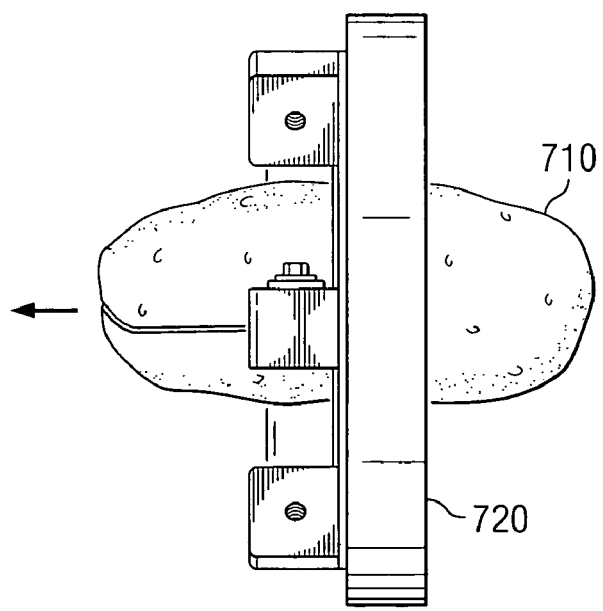
Figure 7C:
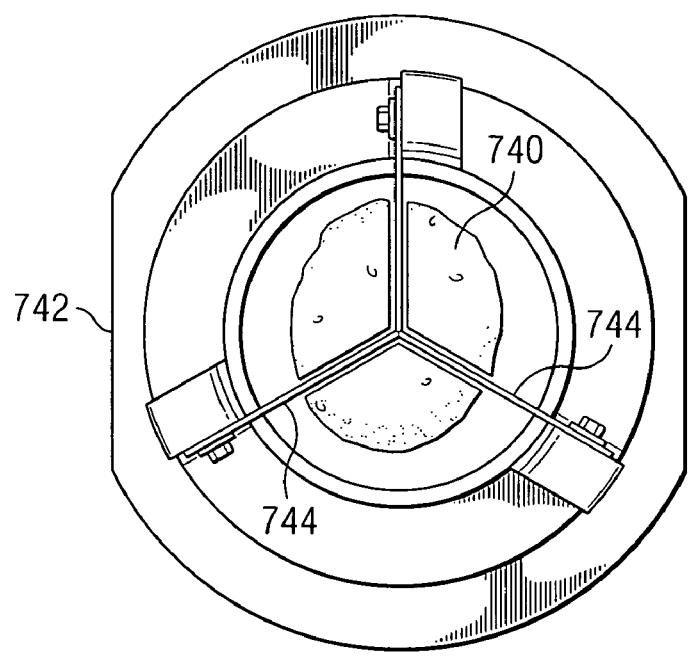
FIGS. 7c and 7d are, respectively, a front elevational view and a perspective view of an oblong potato being cut by a tri-blade segmented cutter having straight blades that radiate from a shared center, in accordance with one embodiment.
Figure 7D:
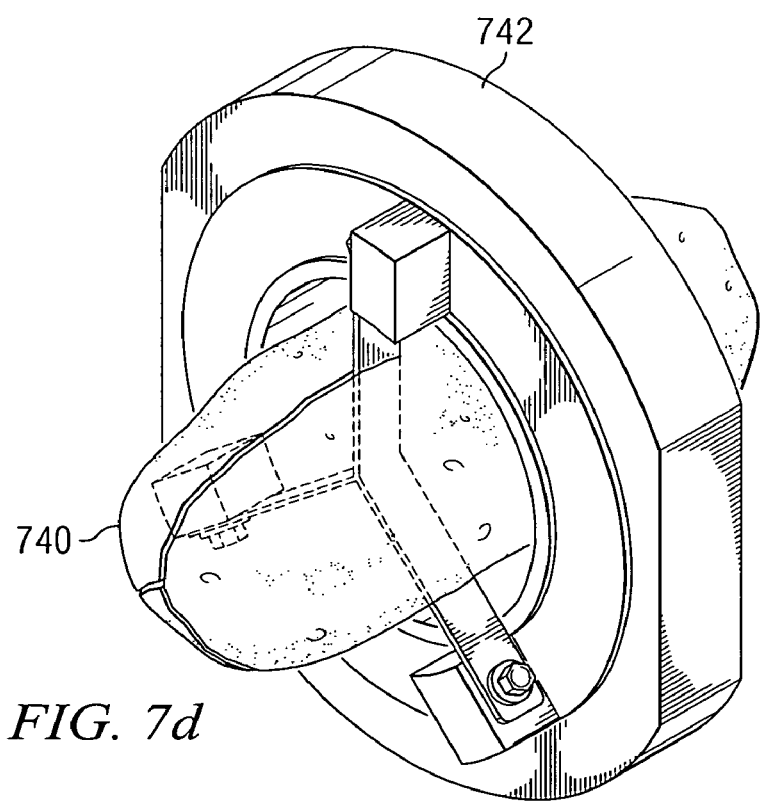

FIG. 7a is a front elevational view of an oblong potato 710 being cut by a tri-blade segmented cutter 720 having curved blades 730 that radiate from a shared center, in accordance with a preferred embodiment. FIG. 7b is a side elevational view of an oblong potato 710 being cut by the tri-blade segmented cutter 720 shown in FIG. 7a. Straight blades, however, can still be used to reduce the potato diameters. FIGS. 7c and 7d, for example, show a front elevational view and a perspective view of an oblong potato 740 being cut by a tri-blade segmented cutter 742 having straight blades 744 that radiate from a shared center.

Figure 7E:
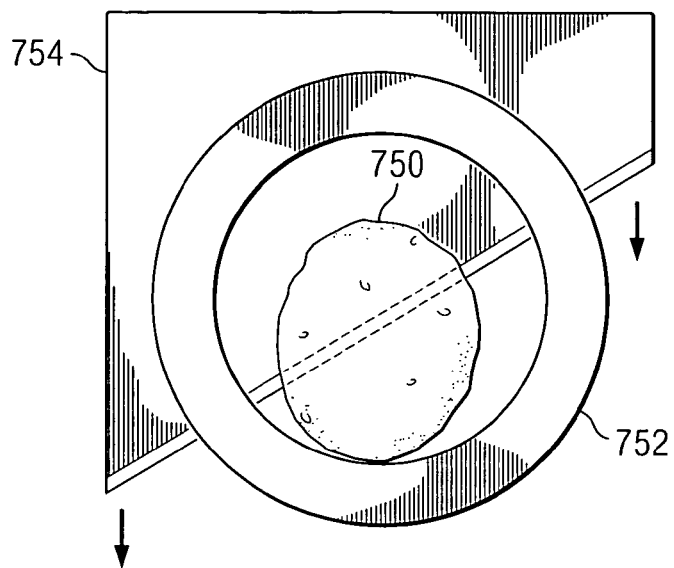
FIGS. 7e and 7f are, respectively, a front elevational view and a perspective view of an oblong potato being cut by a prior art potato halver.
Figure 7F:
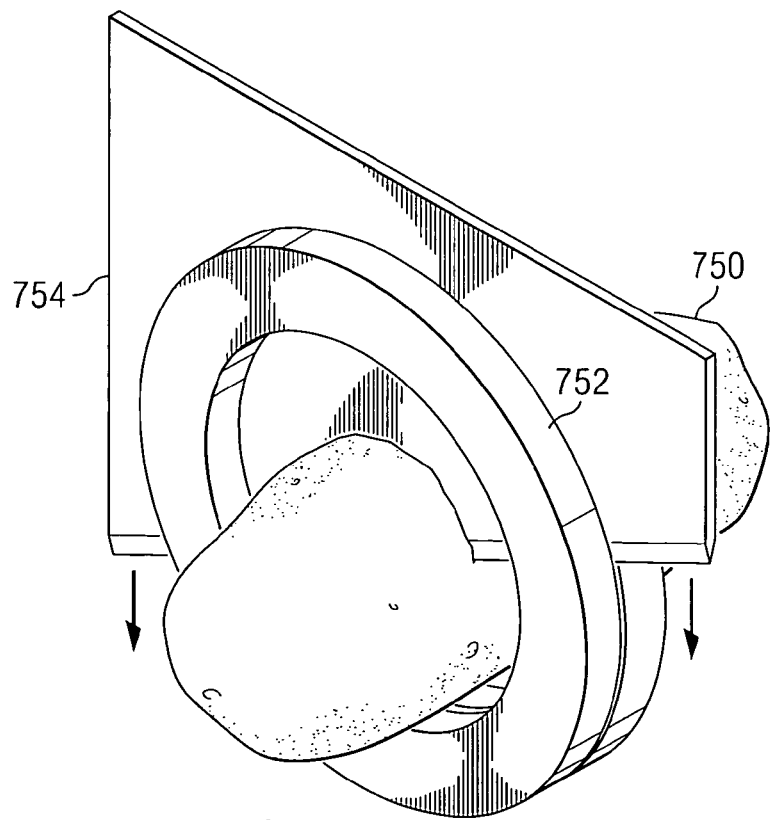
Figure 7G:
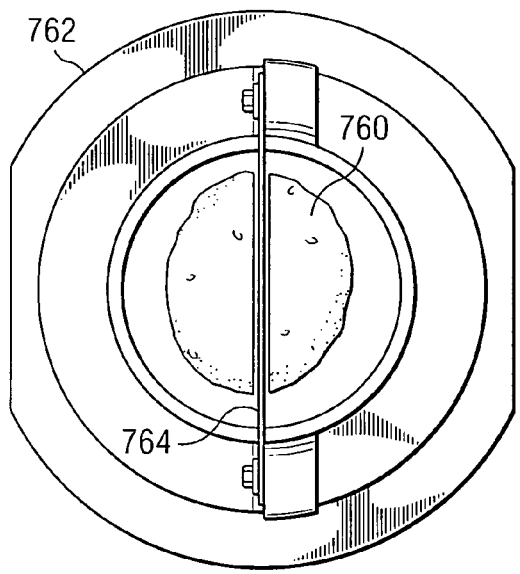
FIGS. 7g and 7h are, respectively, a front elevational view and a perspective view of an oblong potato being cut by a segmented cutter having a single straight blade in accordance with one embodiment.
Figure 7H:
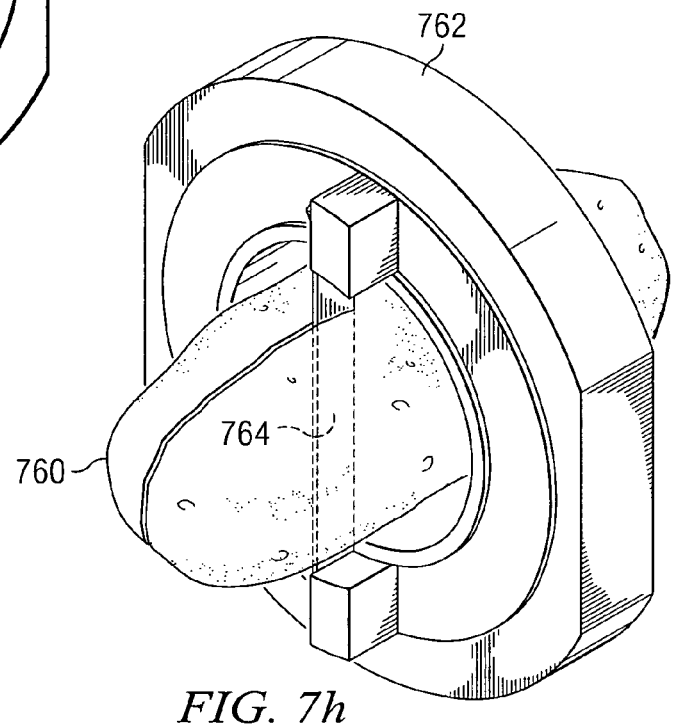

A segmented cutter having any number of blades, however, can be used, as long as the cutter divides food pieces into smaller lengthwise segments. More than three blades, or as few as one blade, can be used. FIGS. 7g and 7h are, respectively, a front elevational view and a perspective view of an oblong potato being cut by a segmented cutter having a single straight blade in accordance with one embodiment. As explained above, most potatoes tend to be flatter in one dimension. Thus, by orienting a potato so that its flatter dimension is perpendicular to the blade 764, the single-blade segmented cutter 762 will divide the potato 760 into two lengthwise segments, each having a minor-dimension diameter smaller than that of the original potato 760.

Other types of segmented cutters can be used to reduce the minor-dimension diameters of potatoes and potato pieces. For example, U.S. Pat. No. 5,390,590, granted to Mendenhall, discloses a device for cutting a potato into a plurality of pieces using a fixed array of stationary blades. Prior art potato halvers, however, do not reduce the minor-dimension diameters of potatoes and potato pieces as efficiently as would a tri-segmented cutter in a preferred embodiment. FIGS. 7e and 7f show a front elevational view and a perspective view of an oblong potato 750 being cut by a prior art potato halver. As seen in FIGS. 7e and 7f, a prior art potato halver's blade 754 cuts an elongated/oblong potato, secured by supports 752, lengthwise into two pieces, both pieces having diameters substantially similar or equal to the diameter of the whole potato before cutting. Such prior art halvers provide inefficient means for reducing the minor-dimension diameters of potatoes or potato pieces. Thus they cannot be effectively used where such potatoes or pieces will be fed lengthwise into transverse slicers.

Diverter and Eductor Stages

Figure 8A:
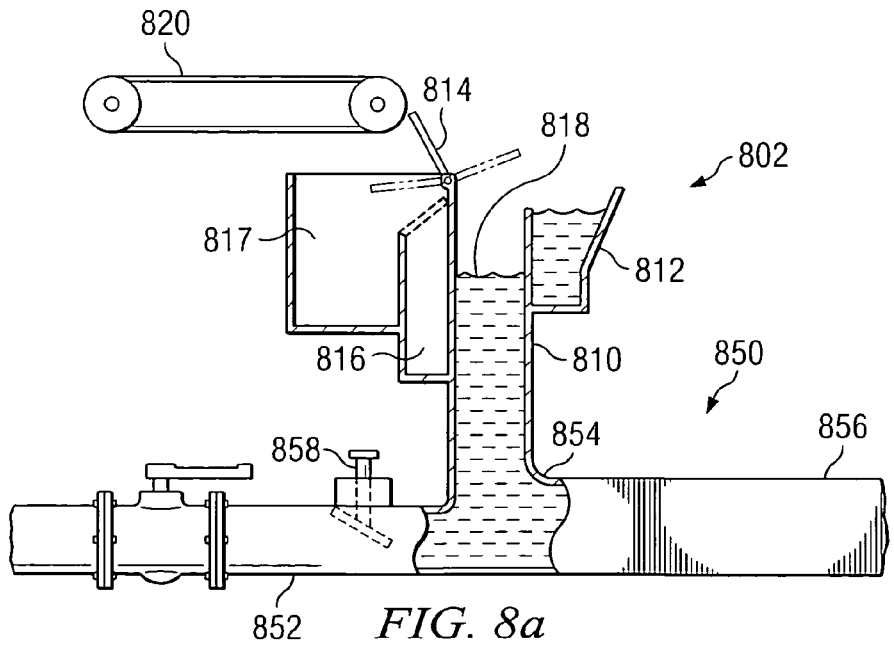
FIG. 8a is a side cross-sectional view of a diverter stage and an eductor stage in accordance with a preferred embodiment of the invention.
Figure 8B:
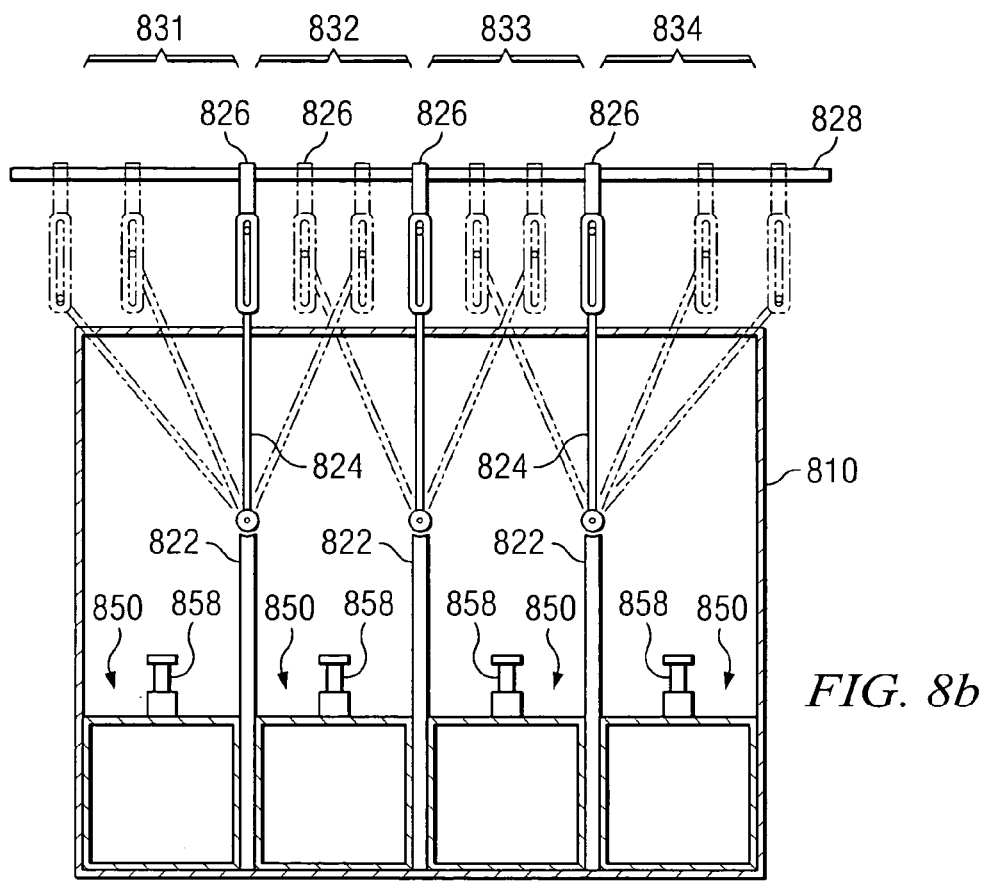
Figure 8C:
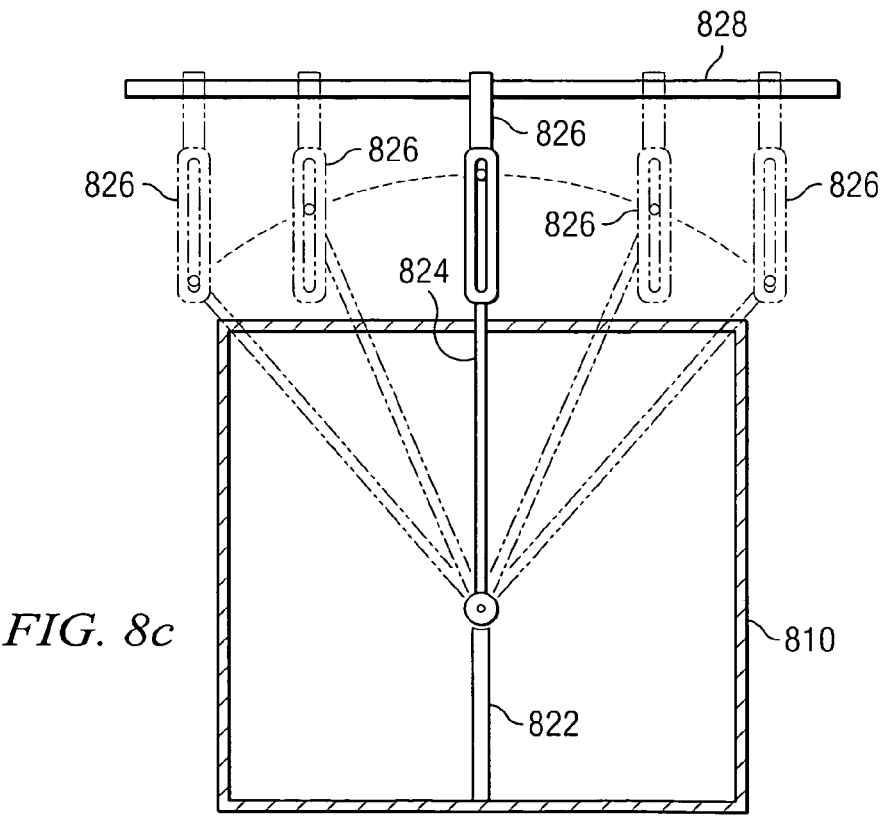

FIG. 8a is a side cross-sectional view of a diverter stage 802 and an eductor stage 850 in accordance with a preferred embodiment of the invention. FIG. 8b is a front cross-sectional view of the diverter stage 802 and the eductor stage 850 shown in FIG. 8a, and FIG. 8c is a front cross-sectional view of one diverter of the diverter stage 802 shown in FIG. 8a. FIGS. 8b and 8c both depict the diverters in various positions in order to show the extent of their movement. In FIG. 8a, the diverter stage 802 comprises a descending housing 810 that encloses several movable diverters. While the descending housing 810 of the diverter stage 802 is substantially vertical in a preferred embodiment, the diverter stage 802 need not be perfectly vertical and can instead be at an angle if desired. A feed conveyor 820 or other feed means introduces potatoes to the top of the descending housing 810. In a preferred embodiment, the feed conveyor 820 comprises the vibratory and/or weigh conveyor of the mass-flow/spreading conveyor. Note, however, that the diverter and eductor stages 802, 850 can be used to used in other applications to divide and propel a flow of food items, and the diverter and eductor stages 802, 850 need not be limited to transporting potatoes from a mass-flow/spreading conveyor to slicers. The diverter and eductor stages 802, 850, for example, can be used simply to divide a flow of food items and hydraulically transport the items from one place to another. A movable plate 814 hinged to the upstream side of the descending housing 810 can be positioned to bridge the gap between the feed conveyor 820, as well as control the flow of potatoes into the diverter. When the plate 814 is positioned to completely bridge the gap, the potatoes flow unimpeded into the diverter stage 802. When the plate 814 is angled upwards and away from the feed conveyor 820, the potatoes are prevented from entering the diverter stage 802 and are directed into a bypass hopper 817. While the bypass hopper 817 is an open container in the embodiment shown in FIG. 8*a*, the bypass hopper 817 can comprise any structure for receiving potatoes such as a chute, trough, or a return conveyor. Between the bypass hopper 817 and the descending housing 810 is a water receptacle 816 having a drain. The water receptacle 816 collects any water that falls from the potatoes and/or splashes out of the diverter stage 802 as the potatoes drop into the water in the descending housing 810 from the feed conveyor 820. A grate or other water-pervious structure can be placed at an angle over the top of the water receptacle 816 to ensure that any bypassed potatoes do not enter the water receptacle 816. If the plate 814 is angled horizontally or downward into the bypass hopper 816, some of the potatoes will flow into the diverter stage 802, and some will flow into the bypass hopper 816. Due to the hydrostatic pressure at the bottom of the descending housing 810, water collects in the descending housing 810 to form a column of water. FIG. 8*a* shows a waterline 818 at the top of the column of water. As potatoes enter the descending housing 810 of the diverter stage 802, a flow of water can also be introduced into the top of the descending housing 810. This downward flow of water helps force down any floating potatoes. If desired, water can first be introduced into a reservoir 812 attached to the outside of the descending housing 810. The water fills the reservoir 812 and then flows over a weir between the reservoir 812 and the descending housing 810 into the diverter stage 802. Note, however, that the waterline/level 818 is independent of the downward flow rate of water entering the descending housing 810. This is because the waterline/level 818 depends on the hydrostatic pressure at the bottom of the descending housing 810 and not the downward flow rate of water.

Depending on where the waterline 818 is, the movable diverters may or may not be submerged in water. The water in the diverter stage 802 softens the potatoes' descent downward, as the potatoes encounter more drag when traveling through water than through air. Furthermore, water itself supports much of the weight of the potatoes, as the specific gravity of potatoes usually falls between 1.08 and 1.1. The water thus provides the potatoes a more gentle passage through the diverter stage. Thus, the higher the waterline 818, the shorter the distance the potatoes must fall and accelerate through the air before entering the water and/or encountering the diverters, and the more gentle the potatoes' descent will be. In a preferred embodiment, the water completely submerges the diverters, and the waterline 818 is as high as possible, near the top of the descending housing 810. For a given installation pressure (or head pressure), the level in the diverter stage can be controlled by adjusting the eductor settings, as will be explained in more detail below.

As seen in FIG. 8*b*, the descending housing 810 of the diverter stage 802 encloses three fixed dividers 822 and three movable diverters 824 hinged at their bottoms to the top of the three fixed dividers 822. These diverters 824 and dividers 822 distribute a downward flow of potatoes among four lanes or channels 831, 832, 833, 834. If desired, the diverters 824 and/or dividers 822 can be perforated rather than solid in order to allow water to pass through, thereby allowing the water pressure and water levels to equalize throughout the diverter stage 802. The top ends of the movable diverters 824 are attached to three linear positioning members 826 that move within a horizontal positioning carriage 828. In a preferred embodiment, the positioning carriage 828 comprises several rod-less cylinder magnetic positioners. Each diverter 824 is attached to its own magnetic positioner. Alternatively, the positioning carriage 828 can simply comprise several pulleys and belts to which the positioning members 826 are attached. In such case, the pulleys are rotated in order to move the belts and the attached positioning members 826. In other embodiments, the movable diverters 824 can be positioned with other devices including mechanical/manual, hydraulic and pneumatic devices, and electric servos.

FIG. 8*c* shows an enlarged view of one moveable diverter in accordance with a preferred embodiment of the invention. As shown in FIG. 8*c*, each positioning member 826 should be able to accommodate some variance in the vertical position of the point of contact with the corresponding movable diverter. This variance is due to the change in vertical height of each positioning member 826 as it hinges about the top of the corresponding fixed divider. Each positioning member 826 can, for example, comprise a stiff plate or rail having a vertical slot in which a peg, pin or bolt attached to the top of each moveable diverter can move up and down while being held firmly in a desired horizontal position.

Figure 8D:
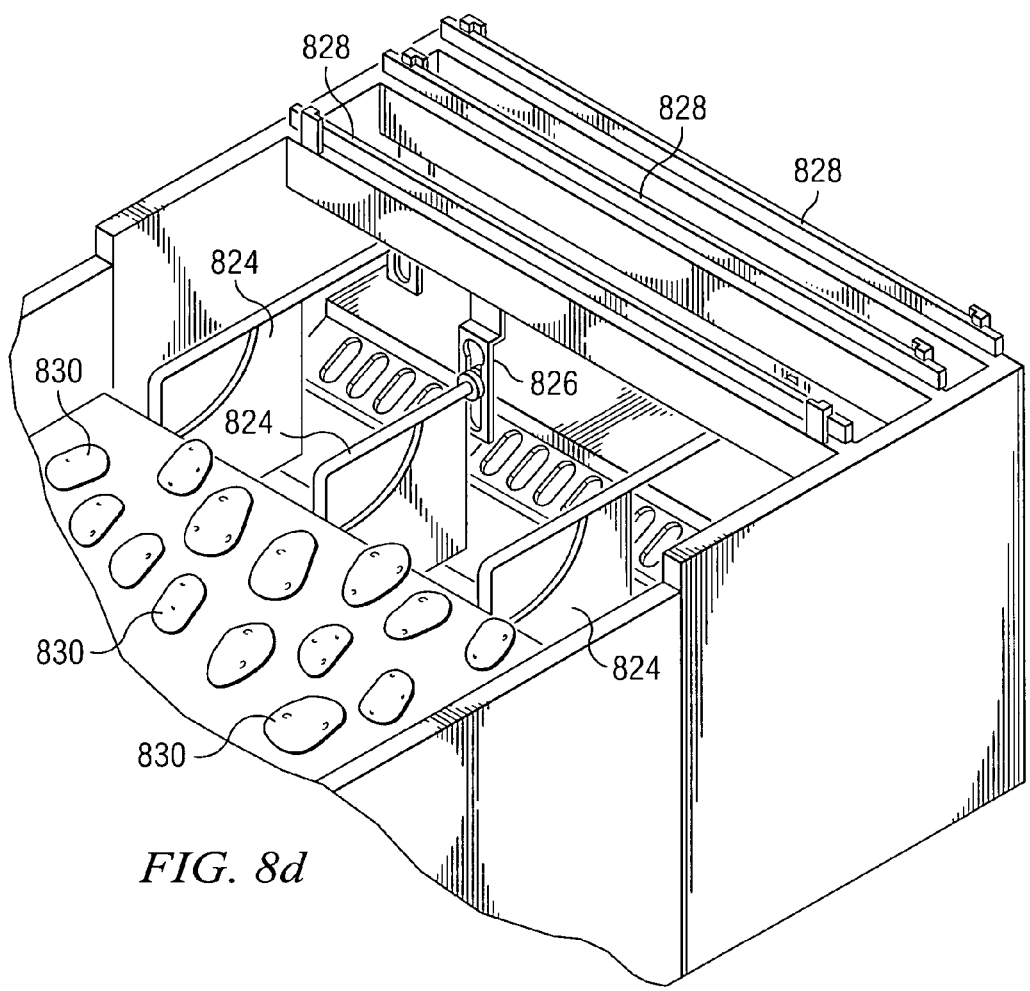
FIG. 8d is a perspective view of several positioning carriages, one for each diverter, in accordance with a preferred embodiment.

FIG. 8*d* is a perspective view of several positioning carriages 828, one for each diverter, in accordance with a preferred embodiment. Each diverter 824 is attached at its top to a positioning member 826, and each positioning member 826 moves horizontally along its own rod-less cylinder magnetic positioner (not shown) within its positioning carriage 828. In the embodiment shown in FIG. 8*d*, positioning sensors along the top of each positioning carriage 828 track the positions of the positioning members 826 and provide feedback to the rod-less cylinder magnetic positiners. FIG. 8*d* shows several potatoes 830 being transferred from a feed conveyor into the top of the diverter stage.

Returning to FIG. 8*b*, each movable diverter 824 can be moved to alter the distribution of potatoes introduced from above. The position of the diverters 824 affects the flow of top water and potatoes (or other product) into each lane by altering the horizontal cross-sectional area of the downward flow that is diverted into each lane. For example, in order to increase the flow of potatoes to the first lane (left-most lane) 831 and decrease the flow to the other three lanes 832, 833, 834, the left diverter can be moved to the right in order to increase the cross-sectional area of the downward flow of potatoes diverted into the first lane 831. The center and right diverter must also be moved to the right, although to different degrees, in order to evenly divide the remaining downward flow of potatoes among the second, third, and fourth lanes 832, 833, 834. As a second example, the center diverter can be positioned vertically and the left and right diverters angled towards the center diverter in order to increase the flow of potatoes to the first and fourth lanes 831, 834 and decrease the flow of potatoes to the second and third lanes 832, 833. Likewise, the diverters can also be moved to shut off the potato flow to one or more lanes. As will be explained in more detail below, the positioning members 826 can be programmed to respond to an imbalanced distribution of work among the slicers, to balance the speed of the slicers, or to divert the flow of potatoes away from a plugged slicer.

After being diverted into four lanes, the potatoes enter an eductor stage 850 where they are drawn along jet streams of water towards the slicers. FIG. 8a shows a side cross-sectional view of an eductor 850 in accordance with a preferred embodiment of the present invention. FIG. 8b shows a front cross-sectional view of a manifold of several eductors in accordance with a preferred embodiment of the present invention. The use of a separate eductor for each lane adds flexibility to the system, as each eductor can be adjusted according to the properties and operating conditions of each lane. For example, if the eductor infeed tubes are all of different lengths, or if each lane of product must be propelled to a different distance or height, each eductor can be operated at a different flow rate and/or pumping pressure in order to accommodate the unique conditions of each lane. The eductor 850 shown in FIG. 8a comprises a water jet (eductor) inlet pipe 852, a product drawing section T-section 854, and a discharge pipe 856. Water can be supplied to the inlet pipe 852 with any pump suitable for moving liquids, such as a centrifugal or positive displacement pump. The bottom of the diverters feed perpendicularly into an eductor flow between the eductor inlet and outlet pipes 852, 856, thus forming several T-sections 854. In a preferred embodiment, the product-drawing T-sections 854 have square or rectangular cross-sections, while the inlet and outlet pipes 852, 856 have circular cross-sections. Thus, the round inlet and outlet pipes 852, 856 feed into and out of a rectangular manifold of product-drawing T-sections 854. Other cross-sectional shapes, however, can be used for the inlet and outlet pipes 852, 856 and the T-sections 854. The T-sections 854, for example, can be round if desired. The water pressure of the water passing through the inlet pipe 852 supports a head of water in the diverter stage 802 and determines the height of the water level 818. If desired, a restrictive valve 858 can be placed just upstream of the T-section 854 to help control the water level 818 in the diverter stage 802. In a preferred embodiment, the restrictive valve 858 has a flat plate hinged slightly upstream from an moveable valve stem. The angle of the flat plate, and thus the level of restriction, is varied by the vertical position of the valve stem. Other embodiments of the restrictive valve 858, however, are possible. When the valve 854 restricts the cross-sectional area through which the water can pass, the water is forced to accelerate through restricted area to maintain a constant volumetric flow rate. The total energy of the motive water shifts from static pressure to kinetic energy, thus lowering the static pressure of the water in the area surrounding the restrictive valve 858. The area surrounding the restrictive valve 858, which includes the product-drawing T-section 854, then becomes a lower-pressure area with respect to the eductor inlet and outlet areas 852, 856. The water level 818 in the diverter stage, which is determined by the static pressure of the water in the product-drawing T-section 854, therefore decreases as the level of valve restriction increases.

As potatoes have a specific gravity ranging from about 1.08 to 1.10, potatoes generally descend down the column of water and into the product-drawing T-section 854 under the force of gravity. Some potatoes, however, may contain air pockets that cause them to float, preventing them from descending down the diverter stage 802 under the force of gravity alone. Thus, in a preferred embodiment, water is introduced into the top of the diverter stage 802 in order to create a downward current of water (or "top water") sufficient to force the buoyant potatoes down the diverter stage 802 and into the product-drawing T-section 854. For example, a top water flow having a downward vertical velocity of about 0.2 to about 2.0 feet per second is usually sufficient to force buoyant potatoes down the diverter stage 802. If other food items are used, a faster downward flow rate of water can be used to force less dense food items down the diverter stage and into the eductor stage 850. The less dense the food item, the faster the flow rate must be in order to force the food items down. In fact, even food items less dense than water, such as apples which have a specific gravity ranging from about 0.75 to about 0.82, can be forced down the diverter stage as long as the flow rate of the water is fast enough.

As the jet stream of water flows through the valve 858 and passes the product drawing section 854 at high velocity, the jet stream of water draws the descending potatoes (and water if cycled into the diverter stage) from the above diverter stage 802. Once drawn into the jet stream of water, the potatoes are then propelled along with the water through the discharge pipe 856 towards the slicers. The potato-laden eductor flume expands from its previously restricted cross-sectional area to a larger cross-sectional area in the discharge pipe 856. The total energy (static and kinetic energy) of the streams of water passing through the eductor stage 850 and diverter stage 802 affects the distance and elevation to which the potatoes can be transported. For example, the more pumping energy expended, the further the potatoes can be moved. With no moving parts, eductors are more gentle on the potatoes than prior art centrifugal-type pumps. Furthermore, the lack of moving parts makes eductors easy to maintain and operate.

The potatoes and water can be discharged to a dewatering stage at a point that is below or above the water level 818 in the diverter stage 802. The final elevation and distance, however, will determine the degree of gentleness with which the potatoes can be moved. For example, if the potatoes only need to be transported a short distance and to a point that is below the water level 818 in the diverter stage 802, a relatively low pumping pressure will be sufficient to move the potatoes to the dewatering stage. The lower the pressure employed, the more gently the potatoes can be moved. If the potatoes must be transported a long distance or to an elevation higher than the water level 818 in the diverter stage 802, the pumping pressure through the eductors 850 must be increased. This reduces the level of gentleness with which the potatoes may be moved. To maintain the desired water level 818 in the diverter stage 802, the valve restriction must be increased to accommodate a greater static pressure differential between the eductor inlet 852 and the T-section 854. Increasing the restriction causes the water's velocity through the T-section 854 to increase, which further reduces the gentleness with which the potatoes can be transported.

Even so, eductors 850 provide a more gentle method of conveying potatoes than the prior art centrifugal-type impeller pumps.

Figure 9:
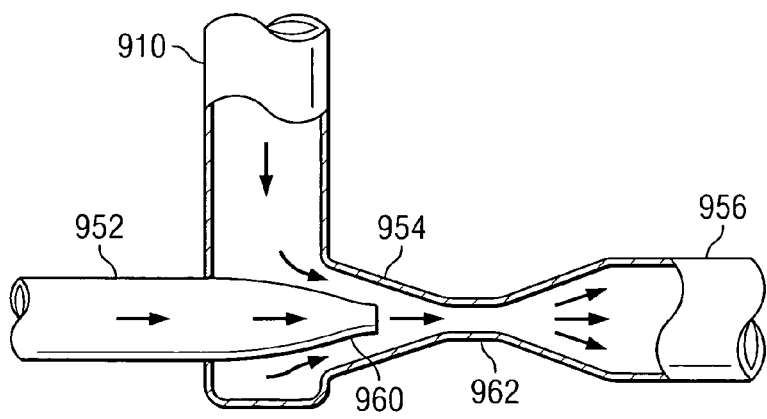
FIG. 9 is a side cross-sectional view of another embodiment of an eductor.

FIG. 9 is a side cross-sectional view of another embodiment of an eductor. Note, however, that the eductor shown in FIG. 9 is not drawn to scale. FIG. 9 simply illustrates conceptually the parts of the eductor and their relative positions. Like the eductor shown in FIG. 8*a*, the eductor shown in FIG. 9 comprises a water jet inlet pipe 952, a product drawing section 954, and a discharge pipe 956. The eductor shown in FIG. 9, however, has a jet inlet pipe 952 that extends into, and is concentrically nested within, a portion of the product drawing section 954. The product drawing section 954 narrows to form a venturi neck 962 before expanding into the discharge pipe 956. Although the product drawing section 954 narrows at the venturi neck 962, the inner diameter must still be large enough to accommodate the food items being propelled through the eductor. The jet inlet pipe 952 also has a narrowing terminal portion 960 near the venturi neck 962. In this embodiment, water flowing through the inlet pipe 952 increases in velocity as it passes through the narrowing terminal portion 960. As the water flows past the product drawing section 954, it draws potatoes from the descending housing of the diverter stage. The water and potatoes then continue through the venturi neck 962 and then spread out in the discharge pipe 956. The eductor flume (water jet) then propels the potatoes further along the process. Note, however, that in other embodiments of the eductors, the product drawing sections need not narrow to form venturi necks. For example, products denser than water can simply be introduced under the force of gravity into motive fluid flowing in a simple pipe or channel rather through a narrowing section of pipe.

In yet another embodiment, ring-type eductors can be used to draw the potatoes and propel the potatoes downstream. A ring-type eductor has two concentrically nested tubes—an outer tube and an inner tube—in which the inner tube supplies the product to be drawn and propelled, and the space between the inner tube and the outer tube is used to supply the propelling fluid. The inner tube terminates with an open end within the outer tube where the product is to be drawn. As the propelling fluid flows through the space between the inner and outer tube and passes the terminal, open end of the inner tube, the fluid draws product out from the inner tube and into the fluid flow. In the alternative, a plurality of smaller jets can be used to draw product out of a product-supplying tube. Note, however, that while several embodiments of eductors have been described herein, other types of eductors, including those well-known in the art, can also be used in accordance with the present invention.

Hydraulically conveying food items, such as potatoes and potato slices, along an enclosed flume of fluid such as water provides at least three advantages over mechanical transporting methods: 1) it adds flexibility to the routing and layout of the transporting path, 2) it is more sanitary, and 3) it provides a faster method of transportation than traditional mechanical means. First, whereas an incline conveyor might otherwise be required to move the food items up and over certain obstacles in a slicing facility, the present invention's method for transporting food items allows simple siphoning action to be used to accomplish the same task. When the food items are transported along an enclosed flume of water, the flume of food items and water can be siphoned above certain obstacles in the plant before leading the flume back down to the elevation of the flume discharge. This enables food items to be temporarily raised in elevation without additional energy input, and it also adds flexibility to the ways in which the food items can be routed throughout the facility. Second, the enclosed nature of flume transportation allows the food items to be transported directly through unsanitized areas without danger of contamination. Furthermore, the fluidizing and subsequent dewatering/draining of the food items acts as a washing and filtration step that helps remove undesirable foreign materials. Third, whereas prior art conveyors typically operate at a rate of about 30 to about 50 feet/minute, a relatively slow food item flume runs at about 180 feet/minute. Transporting food items through a flume of fluid is thus much faster than typical prior art mechanical methods.

Furthermore, the diverter-eductor system of the present invention allows one to use a single source of water and a single pump to transfer potatoes to each slicer of a multi-slicer system. Without such a diverter-eductor system, such a multi-slicer system might otherwise require separate conveyor systems or individual pump-and-flume systems to supply each slicer. Thus, the diverter-eductor system's ability to divide a single supply of water into several independently controllable streams adds flexibility to the system and reduces capital and operating costs.

Dewatering Stages

Figure 10A:
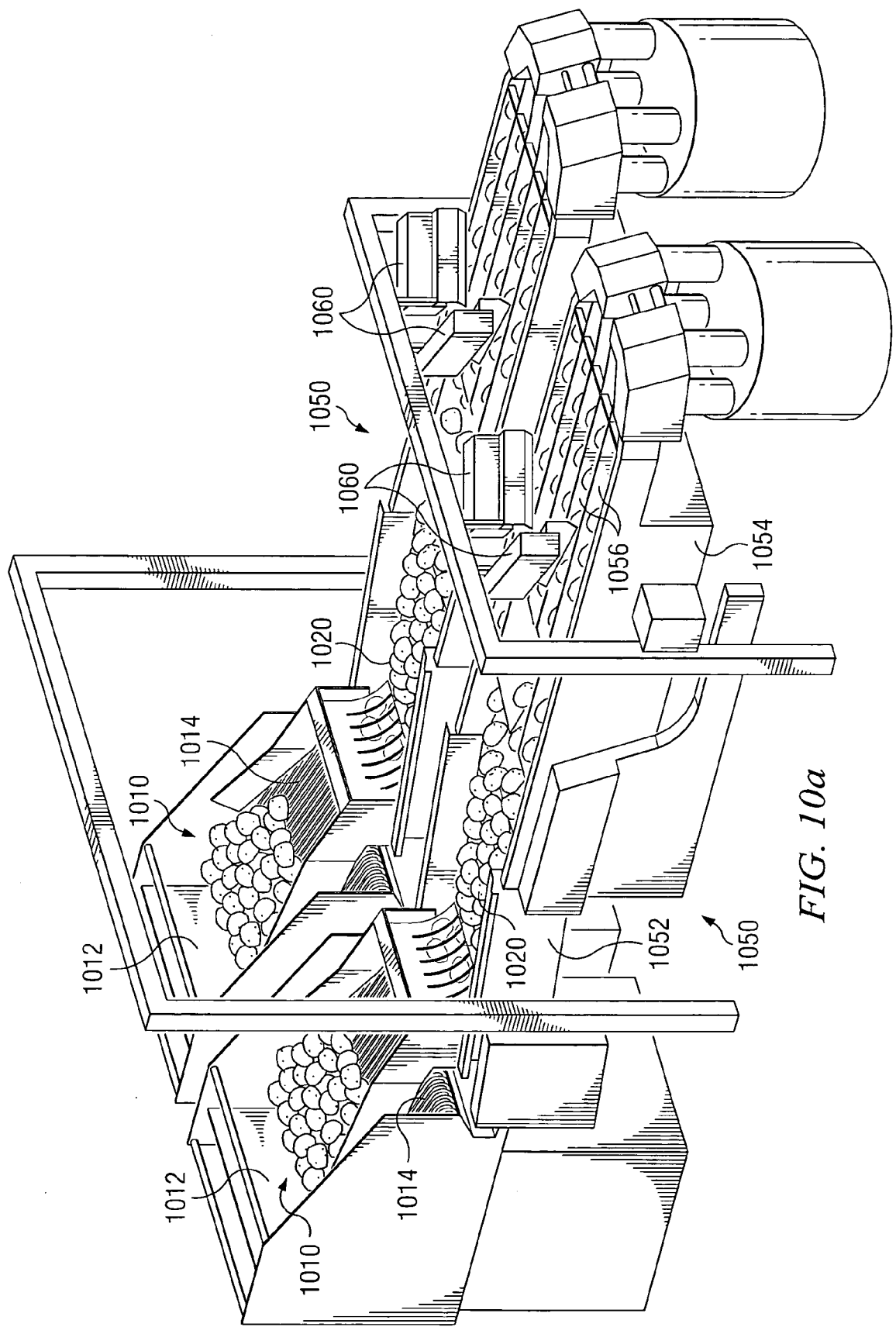
FIG. 10a is a perspective view of a dewatering stage and a slicer infeed conveyor having two separate sections in accordance with one embodiment of the present invention.
Figure 10B:
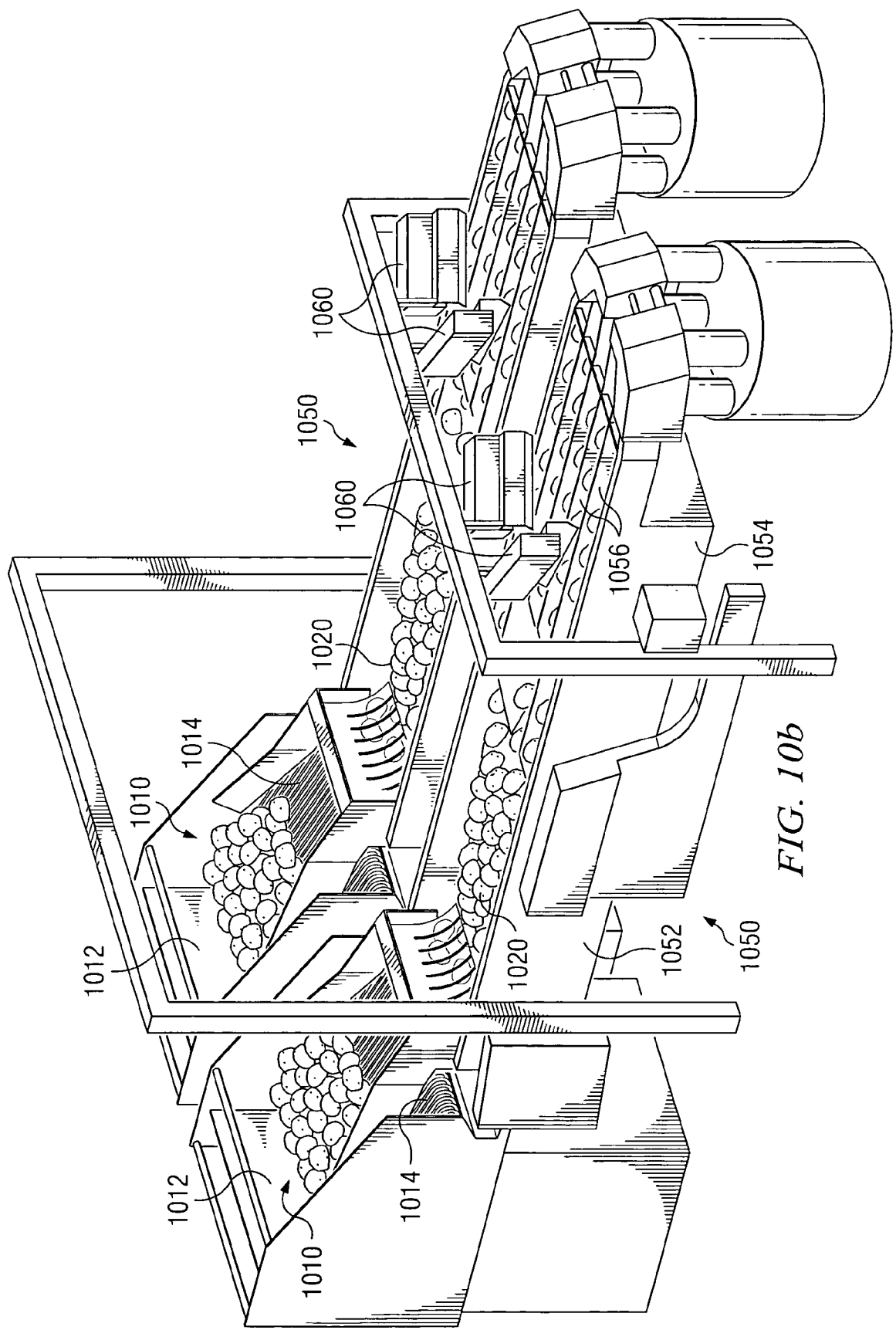
FIG. 10b is a perspective view of a dewatering stage and a unitary slicer infeed conveyor in accordance with one embodiment of the present invention.

FIGS. 10*a* and 10*b* depict dewatering stages 1010 in accordance with a preferred embodiment of the present invention. U.S. Pat. No. 6,540,911, granted to Bajema, for example, also discloses a dewatering system in accordance with a preferred embodiment of the present invention. As shown in FIGS. 10*a* and 10*b*, each eductor flume 1012 of potatoes and water is discharged over a declining slotted ramp 1014 having holes or slots through which water but not potatoes can pass. As the potatoes 1020 tumble and slide down the ramp 1014, the water drains from the potatoes 1020 and through the slotted ramp 1014 to a water receptacle. The potatoes 1020 are then discharged from the ramp 1014 onto a slicer infeed conveyor 1050. Although the ramp 1014 shown in FIGS. 10*a* and 10*b* comprises evenly spaced metal strips, other embodiments of passive dewatering systems are possible. For example, the ramp 1014 can comprise a plurality of strips of other materials such as plastic, rubber, alloy, wood, and ceramic. The ramp can also comprise a grid structure or holed surface if desired. In an alternate embodiment, the dewatering stage 1010 can comprise an active dewatering system such as a rotating screen, rope conveyor, or vibratory conveyor. Such a screen or conveyor can be made of wire mesh, a plurality of ropes or chains, or a flexible grid.

Slicer Infeed Conveyors

Returning to FIGS. 10*a* and 10*b*, the figures also show two slicer infeed conveyors 1050 in accordance with a preferred embodiment of the present invention. There is one slicer infeed conveyor 1050 for each stream of potatoes 1020 discharged from the eductor stage. Each slicer infeed conveyor 1050 shown in FIG. 10 comprises a vibratory conveyor, preferably on load cells, that evenly spreads a flow of potatoes 1020 into multiple lanes. The slicer infeed conveyors accomplish four main functions: 1) evenly spread a flow of potatoes across a given area feeding into several lanes; 2) distribute the potatoes uniformly among several lanes; 3) align the potatoes substantially lengthwise and single-file down the several lanes; and 4) feed each lane of oriented potatoes into a corresponding feed tube of a slicer. By using load cells to maintain a constant mass on the slicer infeed vibratory conveyor 1050, one can ensure that the conveyor discharges the same mass flow rate that it receives and does not accumulate or dissipate mass, which can occur with typical vibratory conveyors. Typical vibratory conveyors without load cells transport different sized potatoes at different rates, thus the momentary mass flow rate exiting such conveyors does not always equal the momentary entering mass flow rate at a given point in time.

The first portion 1052 of each slicer infeed conveyor 1050 comprises a relatively flat vibratory surface for evenly spreading the dewatered potatoes 1020. This first portion 1052 may or may not be connected to a second portion 1054. FIG. 10a shows a double-conveyor embodiment in which the first portion 1052 is adjacent but not connected to the second portion 1054. The separation of the first portion 1052 from the second portion 1054 allows the portions 1052, 1054 to be separately controlled if desired. FIG. 10b shows a more preferable single-conveyor embodiment in which the first portion 1052 and second portion 1054 are attached to each other as part of the same conveyor. The second portion 1054 is a dividing segment that includes several evenly spaced dividers 1056. These dividers 1056 run the length of the latter portion of the vibratory conveyor and divide the flow of potatoes into five lanes in a preferred embodiment, with each lane feeding into a separate slicer feed tube. While the embodiments shown in FIGS. 10a and 10b include four dividers 1056 for each slicer infeed conveyor 1050, more or less dividers 1056 can be used depending on the number of feed tubes the downstream slicer has. Sensors 1060 can be positioned in various locations over one or more lanes of the slicer infeed conveyor 1050. As will be explained in more detail below, these sensors 1060 can be used to measure the velocities and/or the duty cycles of the potatoes. Although the sensors 1060 are preferably located near the end of the infeed conveyors 1050, the sensors 1060 can also be located elsewhere. At the end of each lane is a ramp or a downward-sloping chute for leading and reorienting the potatoes into a corresponding feed tube. Each potato enters the corresponding ramp substantially horizontal but then transfers from the ramp into the feed tube in a substantially vertical position (long axis in a substantially vertical position). Note, however, that larger elongated potatoes may tend to align themselves more vertically than smaller or shorter potatoes.

Other embodiments of the slicer infeed conveyor are possible. Any apparatus for transferring potatoes into a slicer can be used. For example, a slicer infeed conveyor can simply comprise a vibratory conveyor that feeds directly into one or more feed tubes of a slicer. A slicer infeed conveyor can also comprise a dewatered potato bin and an incline metering conveyor for transferring a controlled flow rate of potatoes into the corresponding slicer. In yet another embodiment, the slicer infeed conveyor comprises a belt conveyor. Belt conveyors and metering conveyors, however, can be more difficult to maintain and sanitize than vibratory conveyors. Belt conveyors and metering conveyors may also make it more difficult to uniformly distribute potatoes to each feed tube.

Slicers

Figure 1A:
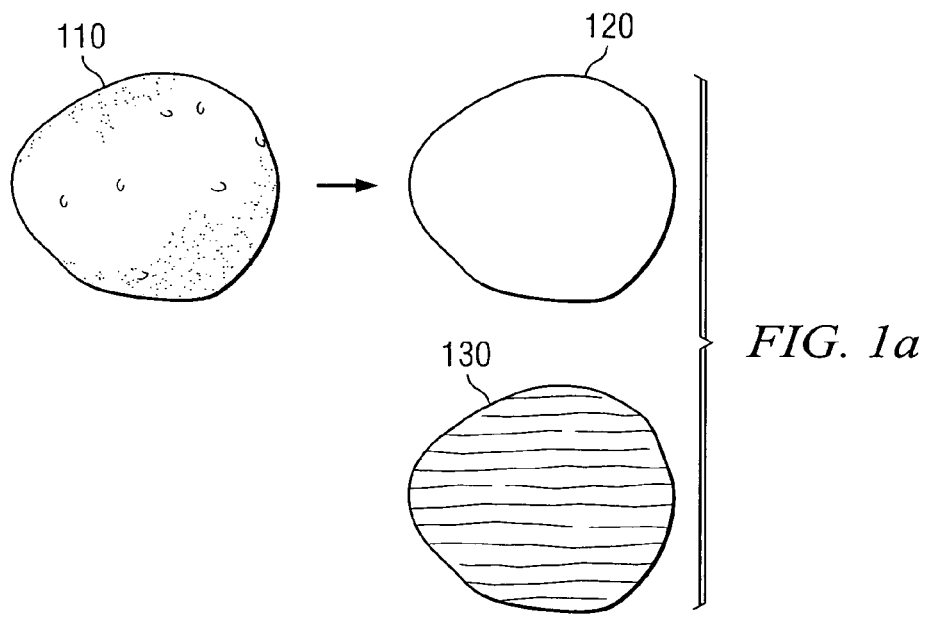
FIGS. 1a and 1b are top side views of examples of slices produced when a centrifugal slicer is supplied with a round potato versus an oblong potato.
Figure 1B:
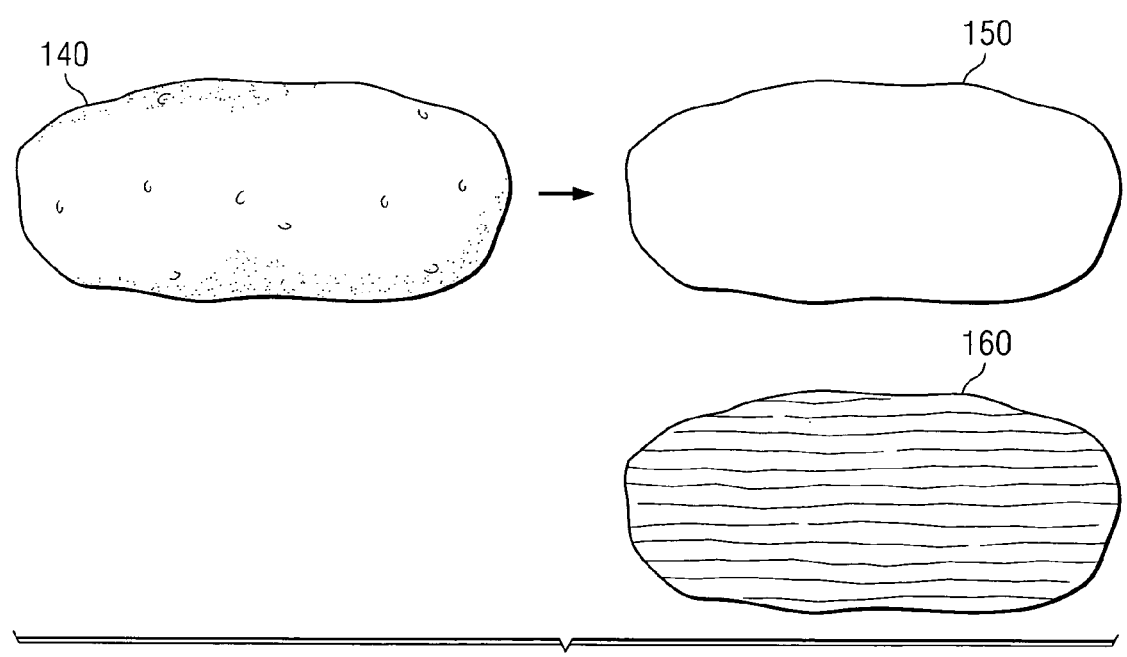
Figure 2:
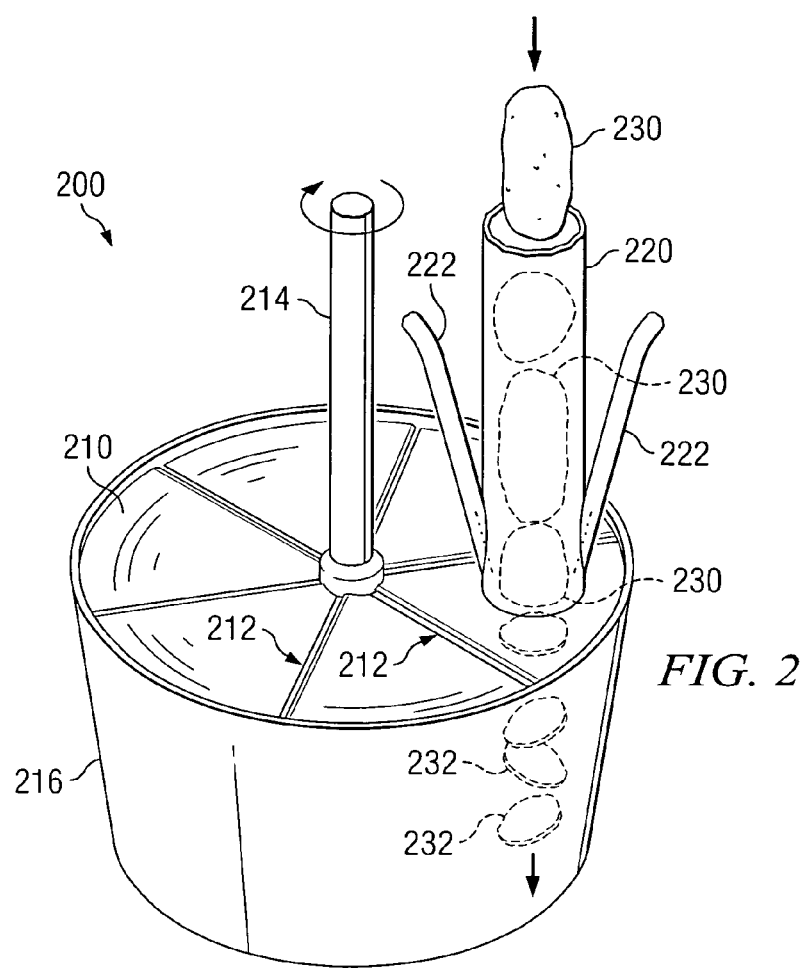
FIG. 2 is a perspective view of one embodiment of a transverse slicer suitable for use with the present invention's system for processing potatoes.
Figure 3:
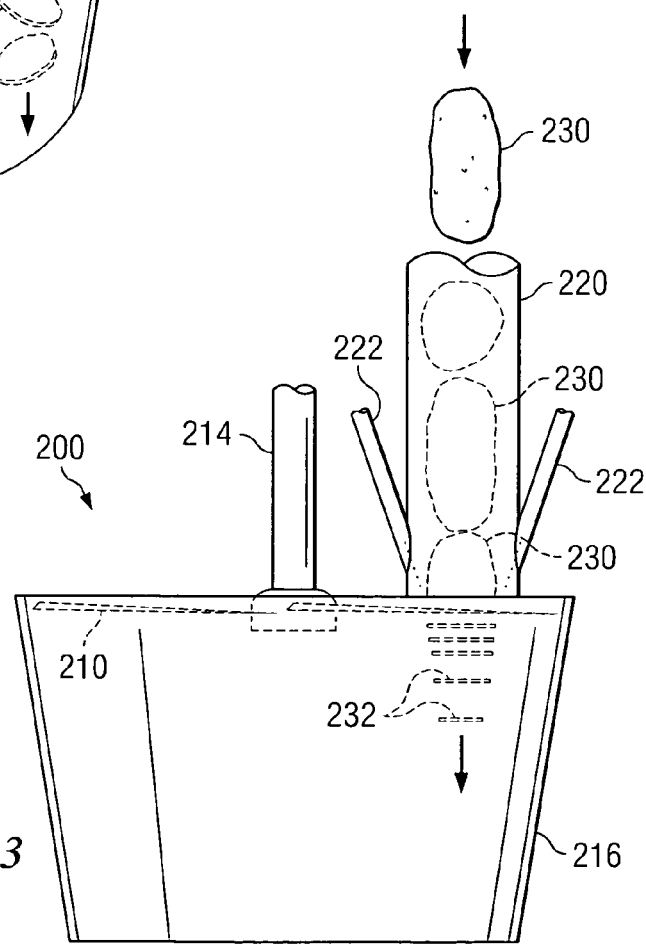
FIG. 3 is a side cross-sectional view of the transverse slicer shown in FIG. 2.

Returning to the flow chart of the potato slicing system shown in FIG. 5, each slicer infeed conveyor 570 discharges several lanes of potatoes 572 into a corresponding slicer 580. In a preferred embodiment, transverse slicers 580 are used to process the potatoes 572. Other types of slicers, however, can be used. FIG. 2 is a perspective view of one embodiment of a transverse slicer 200 suitable for use with the present invention's food processing system. FIG. 3 is a side cross-sectional view of the transverse slicer shown in FIG. 2. Unlike a prior art centrifugal slicer, a transverse slicer 200 such as that depicted in FIGS. 2 and 3 is capable of forming round slices from either round potatoes or oblong potatoes. Furthermore, a transverse slicer does not require a minimum operating speed and can therefore operate at reduced slicing speeds. The transverse slicer 200 shown in FIGS. 2 and 3 comprises a rotary slicing wheel or disk 210 having at least one blade or slit 212 for slicing. The leading edge of the blade 212 (or trailing edge of the slit) is slightly higher in elevation than the adjacent slicing wheel or disk 210 surface, leaving a gap through which slices pass. The size of the gap determines the slice thickness. The slicing wheel 210 rotates about an axle 214. A feed tube 220 leads potatoes 230 in single file to the slicing wheel 210 to be sliced into slices 232. One or more inlets 222 introduce a fluid, such as water or oil, into the feed tube 220 to help fluidize the slices and lubricate the cutting process. As explained above, jets of fluid may be introduced into the feed tubes for several reasons: 1) they help minimize scrap generation, 2) they can be used to align the potatoes for proper slicing, and 3) they can be used to press the potatoes 572 against the blades with a constant pressure, thereby minimizing unwanted variation in slice thickness. All three benefits can be served if the fluid jets are angled downward and towards the shear edge (cutting edge) of the feed tubes. The shear edge of the feed tubes is the portion of the tube against which the potatoes are pressed as the slicing wheel rotates. Miscuts can occur if the potato being sliced is not already against the shear edge when the potato first comes in contact with a blade. Using fluid jets to stabilize the potatoes thus helps reduce scrap generation and increase yield. Note, however, that other methods for aligning and applying pressure to the potatoes are possible, including mechanical methods. A slicer skirt 216 shrouds the slicing wheel 210 and the area beneath the slicing wheel 210 where freshly cut slices 232 fall and/or collect. As potato slices 232 are cut from potatoes 230, the slices 232 can be collected for transportation to another processing unit. In a preferred embodiment as shown in FIG. 5, the slices 582 are collected by a flume of water under each slicer 580 and transported to a slice spreader 590. Several of the flumes may combine before entering the slice spreader 590. Transporting the slices 582 in flumes of water offers several advantages over prior art mechanical methods of conveying. One advantage is that the flumes of water help wash loose starch and scrap slicing material off the surfaces of the slices 582. A second advantage is that water flumes offer a gentle and sanitary medium of transportation. A third advantage is that water flumes can move the slices 582 more quickly than traditional mechanical methods.

The overall dimensions of the slices produced cannot exceed the cross-sectional dimensions of the feed tube 220 where it meets (or comes close to) the slicing wheel 210.

Thus, when the feed tube 220 is perpendicular to the cutting surface, the slices produced will not exceed the diameter of the circular cross-sectional area defined by the bottom end of the feed tube 220. The slice shapes will tend to be circular with such a configuration. Note, however, that smaller elongated potatoes may lie in a tilted position within the tube as they are being sliced. The resulting slices may therefore be slightly oblong and larger than the potatoes' minor-dimension diameters, but in no case larger than the diameter of the feed tube 220. In contrast, larger elongated potatoes will tend to orient themselves in a more substantially vertical position and create slices that are closer in size to the potatoes' minor-dimension diameters. Thus, transversely slicing potatoes in accordance with the present invention produces more consistently-sized slices from a wide range of potato shapes and sizes than slicing potatoes using prior art centrifugal-type slicers.

While the feed tube 220 shown in FIGS. 2 and 3 is substantially perpendicular to the slicing wheel, the feed tube 220 can be tilted to vary the shape of the slices. When the feed tube 220 is tilted with respect to a vector perpendicular to the slicing wheel 210 surface, the slices produced may approach the oval cross-sectional area defined by the bottom of the feed tube 220 where it meets or approaches the slicing wheel 210. Only oblong potatoes or other oblong-shaped foods, however, will produce different slice shapes when the angle of introduction is tilted.

FIGS. 2 and 3 show only one feed tube 220 for introducing potatoes 230 to the slicing wheel 210. However, more feed tubes can be used to increase the number of slices 232 produced per revolution of the slicing wheel 210. The number of slices 232 produced per revolution can also be increased by increasing the number of blades 212 on the slicing wheel 210.

Figure 4A:
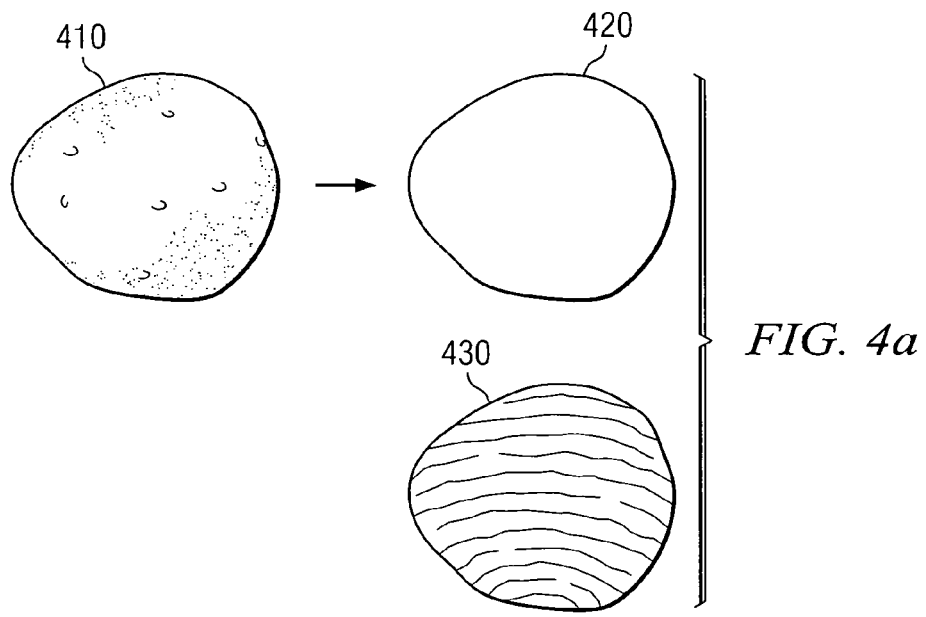
FIGS. 4a and 4b are top side views of examples of slices produced when a transverse slicer is supplied with either a round potato or an oblong potato.
Figure 4B:
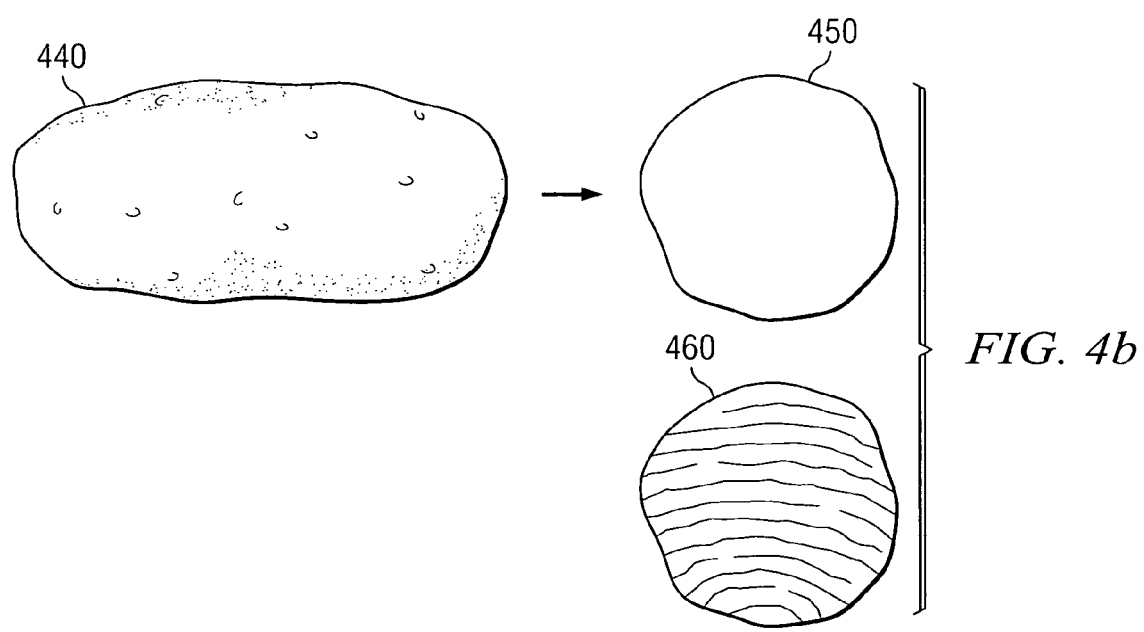

FIGS. 4a and 4b show examples of slices produced when a transverse slicer, such as the one shown in FIGS. 2 and 3, is supplied with either a round potato 410 or an oblong potato 440. A transverse slicer will slice a round chipping potato 410 into round slices with ridges 430 or without ridges 420, depending upon whether the slicer's blade edges are corrugated. A transverse slicer will also slice an oblong potato 440 into round slices with or without ridges 460, 450, depending on whether the blade edges are corrugated. Thus, both round and oblong potatoes 410, 440 can be used in transverse slicers as long as each potato's largest cross-sectional diameter is smaller than the diameter of the slicer's feed tube.

Slice Spreader

FIGS. 11a and 11b are respectively a side elevational view and a perspective view of a slice spreader 1100 in accordance with a preferred embodiment of the present invention. The slice spreader 1100 comprises an inverted siphon, which is a pipeline having its end sections above a middle section, and a spreader discharge 1112. While the term 'inverted siphon' is commonly used in the art, it is somewhat misleading as there is no siphon action involved. In the embodiment shown in FIGS. 11a and 11b, two post-slicer water flumes carrying potato slices converge at a T-section of the flume piping 1114 where the post-slicer flumes then mix and enter the inverted siphon 1110. Note that any number of flumes may lead into the spreader, including a single flume, and such flume or flumes can lead into the spreader at various angles. By controlling the distance that the flume or flumes drop before reaching the water level 1124 within the inverted siphon 1110, the amount of turbulence through the inverted siphon 1110 can be controlled. The degree of turbulence determines the amount of mixing and washing that the slices undergo. Turbulent flow also helps prevent slice clumping. After the flume of slices and water travels through the base of the u-shaped inverted siphon 1110, the flume then encounters a fairly sharp 90-degree turn upwards. At the upward turn of the inverted siphon, the piping transitions from circular piping to a fairly shallow but widening vertical channel 1116. As the flume flows up the vertical channel 1116, the channel 1116 fans out in width from the circular siphon piping to about the width of the receiving conveyor 1118, onto which the slices are discharged. By spreading the slice flume through a widening vertical channel 1116 rather than through a widening horizontal channel, significant floor space can be saved. At the top of the vertical channel 1116, the flume flows through another fairly sharp 90-degree turn into the spreader discharge 1112, which is below the flume piping 1114 feeding into the inverted siphon 1100. The spreader discharge 1112 comprises a fairly flat and short channel that is either horizontal or angled slightly downward. If desired, the discharge 1112 can have an adjustable downward-angled lip 1120 at the end for guiding the flume of slices and water onto the receiving conveyor 1118. The flume piping 1114 and slicer spreader 1100 should comprise a food-grade, sturdy material capable of withstanding operating pressures and flow rates. Acceptable materials include but are not limited to stainless steel, copper, aluminum, other metals or alloys, and PVC or other plastics.

The u-shaped piping of the inverted siphon 1110, the shallow vertical channel 1116 of the inverted siphon outlet, and the sharp turn leading into the spreader discharge 1112 all help maintain a turbulent flow so that the slices become evenly distributed and do not clump together. If desired, air can be introduced into the vertical channel 1116 of the inverted siphon outlet to help maintain a turbulent flow or induce a more turbulent flow. The outwardly-fanning vertical channel 1116 and the spreader discharge 1112 cause the flume of slices and water to evenly distribute over the width of the receiving conveyor 1118. If desired, however, the spreader discharge 1112 can be tilted towards one side of the receiving conveyor 1118 in order to change the distribution of slices. For example, if a greater density of potato slices is desired on the left side of the receiving conveyor 1118, the left side of the spreader discharge 1112 can be pushed downwards (or the right side pushed upwards), thus tilting the discharge 1112. This will shift the distribution of slices towards the left side of the conveyor 1118. FIG. 11c is a front cross-sectional view of a spreader discharge 1112 at various possible angles of tilt.

Returning to FIGS. 11a and 11b, the spreader discharge 1112 and lip 1120, if present, can also comprise a flexible material so that the bottom surface can be flexed upward or downward to affect the distribution of the slices. A curved bottom surface of the spreader discharge 1112 that is concave when viewed from above (bulging downward), for example, will cause a greater concentration of potato slices to collect in the center of the receiving conveyor 1118. Conversely, a curved spreader discharge 1112 that is convex when viewed from above (bulging upward) will cause the distribution of slices to shift towards the edges of the receiving conveyor 1118. FIG. 11d is a front cross-sectional view of a spreader discharge in concave and convex positions. Returning to FIGS. 11a and 11b, the spreader discharge 1112 can furthermore be tilted and flexed simultaneously in order to obtain more complex distributions of slice densities across the width of the receiving conveyor 1118. This is particularly useful in applications where an even distribution does not yield optimal results. Some ovens and fryers, for example, do not apply an even distribution of heat across the width of the feeding conveyor. As will be explained in more detail below, feedback from downstream processing units such as an oven or fryer can be used to adjust the titling and flexing of the spreader discharge 1112. The spreader discharge can be tilted and/or flexed by various devices including pneumatic, hydraulic and mechanical devices, servos, levers, and other devices for adjusting position. Furthermore, the spreader discharge can be adjusted by a manually-controlled or an automatically-controlled actuator or positioner.

Slice Dewatering Stage

In a preferred embodiment, the receiving conveyor 1118 shown in FIGS. 11a and 11b is part of a slice dewatering stage 592 in a slicing system as diagrammed in FIG. 5. The receiving conveyor 1118 can comprise any passive or active water-pervious material such as fixed hydrosieve screens, wire mesh, chain links, perforated cloth, vibratory conveyor or a wire conveyor. However, the ability of the conveyor 1118 to receive potato slices without damaging them during transport must be considered. Thus, the receiving conveyor 1118 is preferably made of a wire-mesh material. In operation, the water passes through the conveyor 1118 and is collected by an effluent pan 1122. Some or all of the water, which contains loose starch and other particles, can be sent to a starch removal stage for recycling. Although not preferred, the water can simply be discarded. The potato slices are collected on the receiving conveyor 1118 and conveyed at an incline out of the effluent pan 1122 for further processing.

Starch Removal

Because the slice flume water is laden with starch and particulates released during slicing, some or all of the separated slice flume water 594 is collected from the slice dewatering stage 592 and sent to a starch removal unit 595 as diagrammed in FIG. 5. If desired, starch-laden water from other stages, such as the potato-flume dewatering stage 550 or the swirl tank 560, can also be sent to the starch removal unit 595 for recycling. Various methods can be used to purify the flume water, including centrifugal separation, screening, filtering, and distillation. In a preferred embodiment, some of the starch-laden water is first screened through a hydrosieve to remove large particles and other solids. The remaining starch-laden water is simply recycled back to the slicers and slice flumes. For example, a vibratory mesh screen such as that manufactured by Sweco, L.L.C., or a rotary sieve such as that manufactured by Lyco Manufacturing, Inc., can be used. The hydrosieved water is then pumped to one or more hydrocyclones to further remove starch. It may also be desirable to further process the water through a rotating vacuum drum filter such as that described in U.S. Pat. No. 2,576,288, granted to Fink et al. After the starch particles and fines have been filtered from the water, the filtered water can be recycled to any part of the process requiring water, such as the diverter, eductor and slicing stages.

Process Control System

Although the process control system will be described with respect to a preferred embodiment in which potatoes are sliced, the process control system is equally applicable to the slicing of other types of produce (or food items). The process control system described herein also applies to systems for slicing vegetables, tubers, nuts, and fruit. Further, the process control system also applies to systems for cutting and coring food items where quality and/or yield suffers with higher device operating rates.

Figure 12:
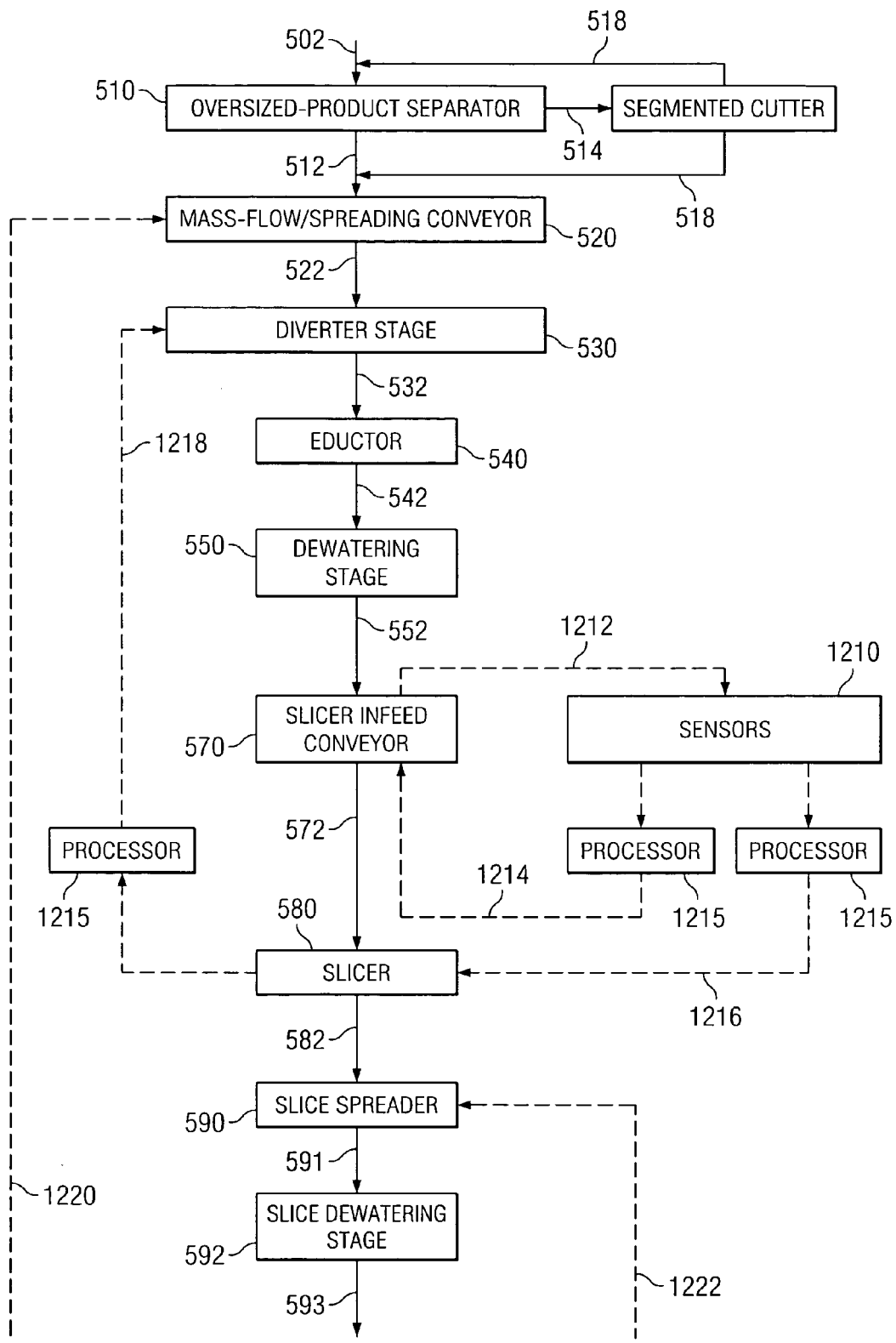
FIG. 12 is a flow diagram of the process control loops used to control the flow of potatoes throughout the system shown in FIG. 5 in accordance with a preferred embodiment of the present invention.

FIG. 12 is a flow diagram of the process control loops used to control the flow of potatoes throughout the system shown in FIG. 5 in accordance with a preferred embodiment of the present invention. For simplicity, FIG. 12 depicts only one diverted flow of potatoes. The same control loops, however, apply to each diverted flow. The mass-flow/spreading conveyor 520, diverter 530, and slicer 580 (and slicer infeed conveyor 570, depending on the method of operation) all have set points 1220, 1218, 1216, 1214 that can be adjusted according to the operating conditions. At startup, each unit is given an initial set point that is set according to predicted operating conditions. These initial set points will remain until a potato feed 502 makes its way through the system, thus enabling downstream process control instruments to produce control feedback.

Once steady state is reached, sensors 1210 positioned over the laning portions of the slicer infeed conveyors 570 (which can be single-conveyor or double-conveyor designs as described above) measure the duty cycles of at least one lane of potatoes leading into each slicer. Depending on the control method, the sensors may also measure individual potato velocities. Various types of sensors can be used including but not limited to optical sensors, laser sensors, Doppler/radar, ultrasonic sensors, and proximity sensors. The term "duty cycle" is defined as the ratio of the combined lengths of the potatoes in a given lane relative to the length of the lane. Thus, a 0.90 duty cycle means that the measured lane is 90% full of potatoes lengthwise, and a 1.00 duty cycle means that the measured lane is completely full lengthwise with no gaps between any potatoes. The velocity and duty cycle information 1212 for the measured lane is used to set the rotational speed 1216 of the corresponding slicer 580.

If the slicer infeed conveyors 570 are double-conveyor designs in which the spreading and laning portions are separate and can be independently controlled, the relative duty cycles of each lane on the laning portions can be used to adjust how the spreading portions operate. For example, if sensors are positioned over each lane of the laning portion of a double-conveyor design, the duty cycles of each lane can then be measured. By comparing the relative duty cycles of each lane, one can determine if there is an uneven or undesirable distribution of potatoes among the several lanes. If the spreading portion can be adjusted to vary the distribution among the several lanes—such as by tilting or other means—then the relative duty cycle data can be used to adjust the spreading portion. This feedback allows the distribution of potatoes among the lanes to be more closely controlled. However, the addition of another feedback loop also increases the complexity of the entire control system, which may make it more difficult to achieve overall system stability.

In a preferred embodiment, the sensors 1210 positioned over the slicer infeed conveyors 570 are proximity sensors that signal when an object is passing beneath/through them. The on and off signals of one proximity sensor (for example, "on" when an item is passing through, and "off" when there is nothing) can be processed to determine the duty cycle of a given lane. The duty cycle is simply the ratio of the amount of time during the sampling period that the sensor read "on" to the total elapsed time during the sampling period. The information collected by two proximity sensors set at a known distance apart (the "sensor separation length") along a given lane can be processed to determine the velocity of the conveyed objects. As an object passes through each proximity sensor, each sensor's reading changes from "off" to "on." The time lag between the two sensors' reading changes is measured, and the velocity of the object is calculated by dividing the known sensor separation length by the time lag.

There are several methods for determining the appropriate slicer speeds. The exact method depends upon the type of slicer infeed conveyors 570 used and the manner in which they are operated. Consider, for instance, an embodiment in which each slicer infeed conveyor 570 has a fixed or predetermined conveyor speed. In such an embodiment, the duty cycle 1212 of the conveyor (or one lane upon the conveyor) is measured, and the known conveying speed and duty cycle information is used to calculate the minimum rotational speed 1216 of the corresponding slicer 580.

In a more preferred embodiment, the velocity of each slicer infeed conveyor 570 is instead adjusted to maintain a constant mass upon the conveyor 570 in order to ensure that the conveyor 570 discharges the same mass flow rate that enters. In such an embodiment, both duty cycles and velocities 1212 are measured, and the information is used to calculate the minimum rotational speed 1216 of the corresponding slicer 580. A processor, such as a programmable logic controller (PLC), periodically adjusts the mass set point 1214 of the slicer infeed conveyor 570 in order to maintain a desired duty cycle.

The number of slices that can be produced in a given period of time, and thus the length of potatoes that can be cut in a given period of time, depends upon the number of slicers and the revolutions-per-minute (RPM) of the slicers. As previously explained, one of the keys to maximizing yield is to minimize potato-slicing losses by minimizing the cutting blade speed. Yield can be maximized by operating each slicer at reduced speed (compared to prior art centrifugal slicer speeds) and by using as many slicers as are necessary to process a desired flow rate. This method results in fewer losses than running a single slicer at high speeds. Where the number of slicers is predetermined, cutting efficiency similarly can be increased by running each slicer at or slightly above the necessary cutting velocity. Thus, in a preferred embodiment, the RPM set point 1216 of each slicer 580 is adjusted to the minimum rate necessary to process the potato flow rate (overall potato length per unit of time) measured by the sensors 1210.

In embodiments where the conveying speed of the slicer infeed conveyor 570 varies, the minimum RPM necessary to process a given flow rate of potatoes is derived by first calculating the overall potato velocity (total length of potatoes to be cut per time, e.g. meters/minute) ($V_o$) using the duty cycle (DC) and the individual potato velocities ($V_i$) (in meters per minute, for example) measured by the sensors 1210. Then the minimum RPM ($RPM_{min}$) will depend upon the properties of the slicer 580, i.e. the thickness of each resulting slice (T) (in meters, for example) and the number of slices produced per revolution (N):

$$V_o = V_i * DC$$

$$RPM_{min} = V_o * (1/T) * (1/N)$$

The measured duty cycle is periodically used to adjust the mass set point of the infeed conveyor 570 in order to achieve the desired potato density.

In embodiments where the slicer infeed conveyor 570 is operated at a constant/predetermined conveying velocity, the minimum RPM necessary to process a given flow rate of potatoes is derived by first calculating the overall potato velocity (total length of potatoes to be cut per time, e.g. meters/minute) ($V_o$) using the duty cycle (DC) measured by the sensors 1210 and the predetermined conveying velocity ($V_c$, in meters/minute, for example). Then the minimum RPM ($RPM_{min}$) will depend upon the properties of the slicer 580, i.e. the thickness of each resulting slice (T) (in meters, for example) and the number of slices produced per revolution (N):

$$V_o = V_c * DC$$

$$RPM_{min} = V_o * (1/T) * (1/N)$$

By setting the RPM 1216 of each slicer 580 in this manner, each potato being sliced will be nearly completely sliced, or will have just finished being sliced, as the next potato (from the same lane and traveling down the same feed tube) approaches the blades of the slicer 580.

It is possible to have the sensors 1210 monitor only one lane if each slicer-feeding lane has similar overall potato velocities. If desired, the RPM 1216 can also be set slightly higher than the calculated minimum RPM. Over time, an average of the calculated minimum RPM measurements can be determined, and the slicers can be set to run at a predetermined ratio of the average except in circumstances where the actual minimum RPM exceeds the predetermined ratio. This manner of operation allows the slicers to be operated with less variation in rotational velocity, and it also helps avoid plugging the slicers 580 or the slicer feed tubes. For example, the operating RPM ("$RPM_{operating}$") can be set in the following manner:

$RPM_{operating} = (RPM_{average} + Y\sigma)$ or ($RPM_{min}$), whichever is greater, wherein "$RPM_{average}$" is the average calculated minimum RPM, "Y" is a multiplying factor, and "σ" is the standard deviation of the calculated minimum RPM data. In a preferred embodiment, "Y" ranges from about 0.5 to about 2.0, which means that the slicers are generally operated at about 0.5 to about 2.0 standard deviations above the average minimum rotational velocity.

In a preferred embodiment, the sensors 1210 monitor each lane of the slicer infeed conveyor 570. Also, the slicer RPM 1216 is determined using the largest duty cycle of the lanes entering the slicer 580, assuming each lane has similar individual potato velocities. This ensures that the slicer blades are rotating fast enough to process every lane of potatoes.

Although potato flows having consistent potato sizes and steady flows would result in steady slicer speeds, variations in potato sizes can cause fluctuations in potato velocities. For example, in a preferred embodiment, the slicer infeed conveyor 570 has load cells and regulates the mass flow rate of potatoes by varying its speed in order to improve the performance of mass-sensitive downstream units such as a fryer. Thus, a group of smaller potatoes will require a faster linear velocity than a group of larger potatoes in order to maintain the same mass flow rate.

In addition to using the sensor data 1212 to adjust the slicer cutting speed 1216, the sensor data 1212 can also be used to maintain an average desired gap between potatoes along the lanes of each slicer infeed conveyor 570. Maintaining a gap between potatoes in each lane helps prevent jamming of the feed tubes and slicers 580. Because the duty cycle (DC) indicates the amount of space present between potatoes, the duty cycle can be used to adjust the mass set point 1214 of the slicer infeed conveyor 570. For example, if the duty cycle is too low, the mass set point 1214 of a slicer infeed conveyor 570 equipped with load cells will be increased to accumulate more potatoes. If the duty cycle is too high—close to 1.00 for example—this means that the potatoes in each lane are too close to each other. When the potatoes are too close to each other, undesirable doubling (where potatoes are no longer in single file) may occur, thus increasing the risk of plugging. The mass set point 1214 of the slicer infeed conveyor 570 will then be decreased in order to increase the gaps between potatoes. The duty cycle measurements can also help detect lane, feed tube or slicer jamming. If the duty cycle for a given lane remains 1.00 even after the mass set point 1214 is adjusted, that particular lane (or downstream feed tube or slicer) is probably jammed. In an automated system, the system can be programmed to alert an operator of a possible jam.

An alternative approach to operating the slicers 580 is to flood the feed tubes of each slicer 580 with potatoes so that there are no gaps between potatoes during slicing. A flooded feed allows an even slower cutting blade speed than that of a spaced feed for a given rate of output. A flooded feed, however, can increase the risk of plugging. It can also reduce slice quality and increase the amount of slicing scrap.

If the slicers 580 are operating at significantly different cutting speeds, this means that the slicers 580 are under significantly different slicing loads. Using the relative rotational speeds 1218 of the slicers, the movable diverters of the diverter stage 530 can be adjusted to change the distribution of potatoes among the slicers 580 and more evenly distribute the slicing loads. For example, if one slicer 580 is operating at a much higher RPM than the other slicers, the diverters 530 can be shifted to reduce the amount of potatoes diverted to the overworked slicer 580 and increase the amount of potatoes diverted to the other slicers 580.

Once the potatoes have been sliced, dewatered, and have been conveyed downstream for further processing, feedback from downstream units can be used to adjust how the slice spreader 590 distributes slices onto the dewatering conveyor of the slice dewatering stage 592. One of the benefits of using a slice spreader in accordance with the present invention is that such a slice spreader has two degrees of freedom in its control. More specifically, the left-to-right distribution and the inner/outer distribution of slices onto the dewatering conveyor are independently controllable. Furthermore, such a slice spreader is scaleable to any size. Assume, for example, that the dewatering conveyor leads slices through a downstream fryer, and the fryer is applying more energy to the middle of the conveyor than at the edge of the conveyor, thereby overcooking the slices in the middle and undercooking the slices at the edges. The slice spreader 590 can be directed to distribute more slices to the middle and fewer slices to the edges of the dewatering conveyor. Such an adjustment to the slice spreader will help make the downstream cooking/frying more consistent. Assume further that, in addition to applying more energy to the middle of the conveyor than at the edges/sides, the fryer also periodically experiences a temporary increase in energy to the right side and a decrease in energy to the left side due to unforeseen circumstances. In such a case, the slice spreader 590 can simply be tilted to the right whenever the fryer experiences a shift in energy to the right side, thus directing more slices to the right side. The slice spreader 590 can be returned to its previous position when the shift in energy disappears. Note that the slice spreader's convex/concave setting need not be altered when adjusting for such a left/right shift.

The mass-flow/spreading conveyor 520 (and inclined metering conveyor, if any) can also be programmed to respond to operating conditions further downstream, such as in an oven or frying stage. If a downstream fryer or oven is being overworked, for example, feedback 1220 from the downstream unit can be used to reduce the flow rate of potatoes 512 through the mass-flow/spreading conveyor 520.

In an automated system, the process control measurements and changes can be controlled using one or more programmable logic controllers (PLC), computers, or other automated devices. However, operators can also manually perform the set point changes and data interpretation discussed above.

Although the food processing system and process control system have been described with respect to slicing potatoes, the food processing system and process control system also apply to slicing other food items including fruits, vegetables, other tubers. Further, the process control system also applies to systems for cutting and coring food items where quality and/or yield suffers with higher device operating rates.

While the invention has been particularly shown and described with reference to a preferred embodiment, it will be understood by those skilled in the art that various changes in form and detail may be made therein without departing from the spirit and scope of the invention.

We claim:

1. A method for maximizing slicing yield while using a transverse slicer to slice a plurality of food items entering at a measurable rate, wherein said plurality of food items has an item velocity, said transverse slicer produces slices having a slice thickness, and said transverse slicer produces a number of slices per revolution, said method comprising the steps of:
   a) providing said plurality of food items on a conveyor having at least one lane, wherein each one of said at least one lane has a duty cycle defined as the ratio of the combined lengths of the food items to the length of the lane;
   b) measuring the duty cycle of at least one lane to obtain at least one measured duty cycle;
   c) feeding said plurality of food items into a transverse slicer; and
   d) operating said transverse slicer so that said slicer has a cutting speed of X rotations per minute, wherein X is substantially equal to or slightly greater than a minimum rotational velocity, and said minimum rotational velocity equals the item velocity multiplied by one of said at least one measured duty cycle, divided by the slice thickness, and divided by the number of slices per revolution.

2. The method for maximizing slicing yield of claim 1 wherein X in step d) is substantially equal to or slightly greater than the item velocity multiplied by the largest of said at least one measured duty cycle, divided by the slice thickness, and divided by the number of slices per revolution.

3. The method for maximizing slicing yield of claim 1 wherein said item velocity is determined by measuring the velocity of said food items.

4. The method for maximizing slicing yield of claim 1 wherein said conveyor has a predetermined conveying velocity, and further wherein said predetermined conveying velocity is used as the item velocity.

5. The method for maximizing slicing yield of claim 1 wherein said conveyor has a variable conveying velocity and an adjustable mass set point.

6. The method for maximizing slicing yield of claim 5 wherein said at least one measured duty cycle is used to adjust the mass set point.

7. The method for maximizing slicing yield of claim 1 wherein said feeding of step c) comprises distributing said food items among at least two lanes and orienting said food items substantially lengthwise within said at least two lanes.

8. The method for maximizing slicing yield of claim 1 wherein an average minimum rotational velocity is obtained by averaging the minimum rotational velocity over time, a standard deviation is obtained from the difference between the average minimum rotational velocity and the minimum rotational velocity over time, and further wherein X in step d) is substantially equal to the larger of the following: i) the sum of the average minimum rotational velocity and the product of a multiplying factor and the standard deviation; and ii) the minimum rotational velocity.

9. The method for maximizing slicing yield of claim 8 wherein the multiplying factor ranges from about 0.5 to about 2.0.

* * * * *